US012710912B2

(12) United States Patent
Choi et al.

(10) Patent No.: US 12,710,912 B2
(45) Date of Patent: Aug. 18, 2026

(54) DISPLAY DEVICE AND OPERATION METHOD THEREFOR THAT SYNCHRONIZE DATA OUTPUT TO DIFFERENT INPUT/OUTPUT DEVICES

(71) Applicant: Samsung Electronics Co., Ltd., Suwon-si (KR)

(72) Inventors: Kilsoo Choi, Suwon-si (KR); Sehyun Kim, Suwon-si (KR); Hyeeun Park, Suwon-si (KR); Sukun Yoon, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/592,886

(22) Filed: Mar. 1, 2024

(65) Prior Publication Data

US 2024/0201933 A1 Jun. 20, 2024

Related U.S. Application Data

(63) Continuation of application No. PCT/KR2022/013151, filed on Sep. 2, 2022.

(30) Foreign Application Priority Data

Sep. 2, 2021 (KR) ........................ 10-2021-0117196

(51) Int. Cl.
*G06F 3/16* (2006.01)
*G06F 3/0484* (2022.01)
(Continued)

(52) U.S. Cl.
CPC .......... *G06F 3/1454* (2013.01); *G06F 3/0484* (2013.01); *G06F 3/165* (2013.01); *H04W 4/80* (2018.02)

(58) Field of Classification Search
CPC ...... G06F 3/1454; G06F 3/0484; G06F 3/165; H04W 4/80
See application file for complete search history.

(56) References Cited

U.S. PATENT DOCUMENTS

| | | | |
|---|---|---|---|
| 9,820,323 | B1 | 11/2017 | Young et al. |
| 11,233,836 | B2 | 1/2022 | Fornshell et al. |

(Continued)

FOREIGN PATENT DOCUMENTS

| | | | |
|---|---|---|---|
| CN | 112055286 | A | 12/2020 |
| CN | 112423197 | A | 2/2021 |

(Continued)

OTHER PUBLICATIONS

International Search Report dated Dec. 7, 2022, in PCT Application No. PCT/KR2022/013151.

(Continued)

*Primary Examiner* — Joseph Saunders, Jr.
(74) *Attorney, Agent, or Firm* — STAAS & HALSEY LLP

(57) ABSTRACT

A display apparatus including a display, and a processor configured to execute one or more instructions stored in a memory to identify that a first audio input/output device and a second audio input/output device, through which audio data is to be output by using a Bluetooth communication protocol, are connected, and based on identifying that different Bluetooth communication profiles are used in Bluetooth communication for outputting the audio data to the first audio input/output device and the second audio input/output device, control a communication interface to delay the audio data output to one of the first audio input/output device and the second audio input/output device for a preset period of time by using a synchronization buffer and then output the audio data, in order to synchronize the audio data (Continued)

output to the first audio input/output device with the audio data output to the second audio input/output device.

14 Claims, 13 Drawing Sheets

(51) Int. Cl.

| | |
|---|---|
| ***G06F 3/14*** | (2006.01) |
| ***H04W 4/80*** | (2018.01) |

(56) References Cited

U.S. PATENT DOCUMENTS

| | | | | |
|---|---|---|---|---|
| 11,720,317 | B2 | 8/2023 | Ryu et al. | |
| 2016/0098244 | A1 | 4/2016 | Hsieh et al. | |
| 2018/0027368 | A1 * | 1/2018 | Girardier | H04N 21/43637 455/41.2 |
| 2019/0387344 | A1 | 12/2019 | Kim et al. | |
| 2020/0382569 | A1 * | 12/2020 | Fornshell | H04M 1/6066 |
| 2021/0014591 | A1 | 1/2021 | Kim et al. | |
| 2023/0370774 | A1 | 11/2023 | Wu | |

FOREIGN PATENT DOCUMENTS

| | | | | |
|---|---|---|---|---|
| JP | 2019-537911 | | 12/2019 | |
| KR | 10-0852642 | | 8/2008 | |
| KR | 10-2008-0095126 | | 10/2008 | |
| KR | 10-2011-0064684 | | 6/2011 | |
| KR | 10-1113930 | | 2/2012 | |
| KR | 20-0465906 | | 3/2013 | |
| KR | 10-2020-0137969 | | 12/2020 | |
| KR | 10-2021-0007289 | | 1/2021 | |
| KR | 10-2021-0008779 | | 1/2021 | |
| KR | 10-2021-0101696 | | 8/2021 | |
| KR | 10-2021-0103114 | | 8/2021 | |
| KR | 20210103114 | A * | 8/2021 | G10L 19/008 |
| KR | 10-2357300 | | 1/2022 | |

OTHER PUBLICATIONS

Office Action dated Feb. 2, 2026, in Korean Patent Application No. 10-2021-0117196.

* cited by examiner

DISPLAY DEVICE AND OPERATION METHOD THEREFOR THAT SYNCHRONIZE DATA OUTPUT TO DIFFERENT INPUT/OUTPUT DEVICES

CROSS-REFERENCE TO RELATED APPLICATIONS

This application is a continuation of International Application PCT/KR2022/013151, filed Sep. 2, 2022, which is incorporated herein by reference in its entirety, and claims foreign priority to Korean Application 10-2021-0117196, filed Sep. 2, 2021, which is incorporated herein by reference in its entirety.

TECHNICAL FIELD

One or more embodiments relate to a display apparatus and an operation method of the display apparatus, and more particularly, to a display apparatus capable of providing synchronization among a plurality of devices connected via Bluetooth and an operation method of the display apparatus.

BACKGROUND ART

A display apparatus such as a television may partition a screen into a plurality of windows and display different content on the windows. When different content is displayed on each of the plurality of windows, audio data corresponding to each piece of content may be output via an audio output device connected in correspondence with each of the windows. As described above, when different content is displayed via multi-view windows, audio data corresponding to each piece of content is reproduced independently, and thus, there may be no issues with synchronization between audio data output in correspondence with the plurality of windows of the multi-view window. However, when the same content is displayed on the plurality of windows included in the multi-view window of the display apparatus, the audio data corresponding to each piece of content may be output via the audio output device corresponding to each window. However, in this case, because the audio data corresponds to the same content, it may be necessary to perform synchronization between the audio data output through the plurality of audio output devices.

DISCLOSURE

Technical Problem

One or more embodiments provide a display apparatus capable of providing synchronization between audio data output through a plurality of audio input/output devices when the audio data corresponding to content displayed on the display apparatus is output through the plurality of audio input/output devices and an operation method of the display apparatus.

Technical Solution

According to an embodiment, a display apparatus includes a display, a communication interface, a memory storing one or more instructions, and a processor configured to execute one or more instructions stored in the memory to identify that a first audio input/output device and a second audio input/output device, through which audio data is to be output by using a Bluetooth communication protocol, are connected. According to an embodiment, the processor may be further configured to execute the one or more instructions to identify that different Bluetooth communication profiles are used in Bluetooth communication for outputting the audio data to the first audio input/output device and to the second audio input/output device. According to an embodiment, the processor may be further configured to execute the one or more instructions to, in order to synchronize the audio data output to the first audio input/output device with the audio data output to the second audio input/output device, control a communication interface to delay the audio data output to one of the first audio input/output device and the second audio input/output device for a preset period of time by using a synchronization buffer.

According to an embodiment, the processor may be further configured to execute the one or more instructions to control the display so as to display a first image of first content through a first window and display a second image of the first content through a second window, in a multi-window including the first window and the second window. According to an embodiment, the processor may be further configured to execute the one or more instructions to obtain the audio data by mixing first audio data corresponding to the first image and second audio data corresponding to the second image.

According to an embodiment, the processor may be further configured to execute the one or more instructions to control the communication interface to process the audio data according to an A2DP Bluetooth profile in order to output the audio data to the first audio input/output device. According to an embodiment, the processor may be further configured to execute the one or more instructions to control the communication interface to process mixing data of the audio data and voice call sound according to an HFP Bluetooth profile in order to output the voice call sound to the second audio input/output device along with the audio data.

According to an embodiment, the processor may be further configured to execute the one or more instructions to control the communication interface to delay the mixing data processed according to the HFP Bluetooth profile for the preset time period by using the synchronization buffer, for the synchronization of the audio data processed according to the A2DP Bluetooth profile with the mixing data processed according to the HFP Bluetooth profile.

According to an embodiment, a predetermined size of the synchronization buffer may correspond to a size of a buffer provided in the first audio input/output device.

According to an embodiment, the processor may be further configured to execute the one or more instructions to control the display to display the graphical user interface allowing the user to adjust the delay time of the synchronization buffer, and then, to adjust the delay time of the synchronization buffer according to the user input received through the graphical user interface.

According to an embodiment, the processor may be further configured to execute the one or more instructions to control the display to display the first content and obtain the audio data corresponding to the first content.

According to an embodiment, the processor may be further configured to execute the one or more instructions to control the communication interface to process the audio data according to an A2DP Bluetooth profile in order to output the audio data to the first audio input/output device. According to an embodiment, the processor may be further configured to execute the one or more instructions to control the communication interface to process mixing data of the audio data and voice call sound according to an HFP Bluetooth profile in order to output the voice call sound to the second audio input/output device along with the audio data.

According to an embodiment, the processor may be further configured to execute the one or more instructions to control the communication interface to delay the mixing data processed according to the HFP Bluetooth profile for the preset time period by using the synchronization buffer, for the synchronization of the audio data processed according to the A2DP Bluetooth profile with the mixing data processed according to the HFP Bluetooth profile.

According to an embodiment, an operation method of the display apparatus includes identifying that a first audio input/output device and a second audio input/output device, through which audio data is to be output by using a Bluetooth communication protocol, are connected. According to an embodiment, the operation method of the display apparatus includes identifying that different Bluetooth communication profiles are used in Bluetooth communication for outputting the audio data to the first audio input/output device and to the second audio input/output device. According to an embodiment, the operation method of the display apparatus includes, according to the above identifying, in order to synchronize the audio data output to the first audio input/output device with the audio data output to the second audio input/output device, delaying the audio data output to one of the first audio input/output device and the second audio input/output device for a preset period of time by using a synchronization buffer.

According to an embodiment, a non-transitory computer-readable recording medium having recorded thereon one or more programs executable by a processor of a display apparatus for implementing an operation method of the display apparatus, wherein the operation method includes identifying that a first audio input/output device and a second audio input/output device, through which audio data is to be output by using a Bluetooth communication protocol, are connected, and as it is identified that different Bluetooth communication profiles are used in Bluetooth communication for outputting the audio data to the first audio input/output device and to the second audio input/output device, in order to synchronize the audio data output to the first audio input/output device with the audio data output to the second audio input/output device, delaying the audio data output to one of the first audio input/output device and the second audio input/output device for a preset period of time by using a synchronization buffer.

Advantageous Effects

According to various embodiments of the disclosure, when audio data corresponding to content displayed on a screen of a display apparatus is output through a plurality of audio input/output devices, synchronization of the audio data output through the plurality of audio input/output devices may be provided.

According to various embodiments of the disclosure, when audio data corresponding to each piece of content output through each window of a multi-window in a display apparatus providing the multi-window is output through a corresponding audio input/output device, synchronization of the audio data output through a plurality of audio input/output devices may be provided.

MODE FOR INVENTION

Figure 1:
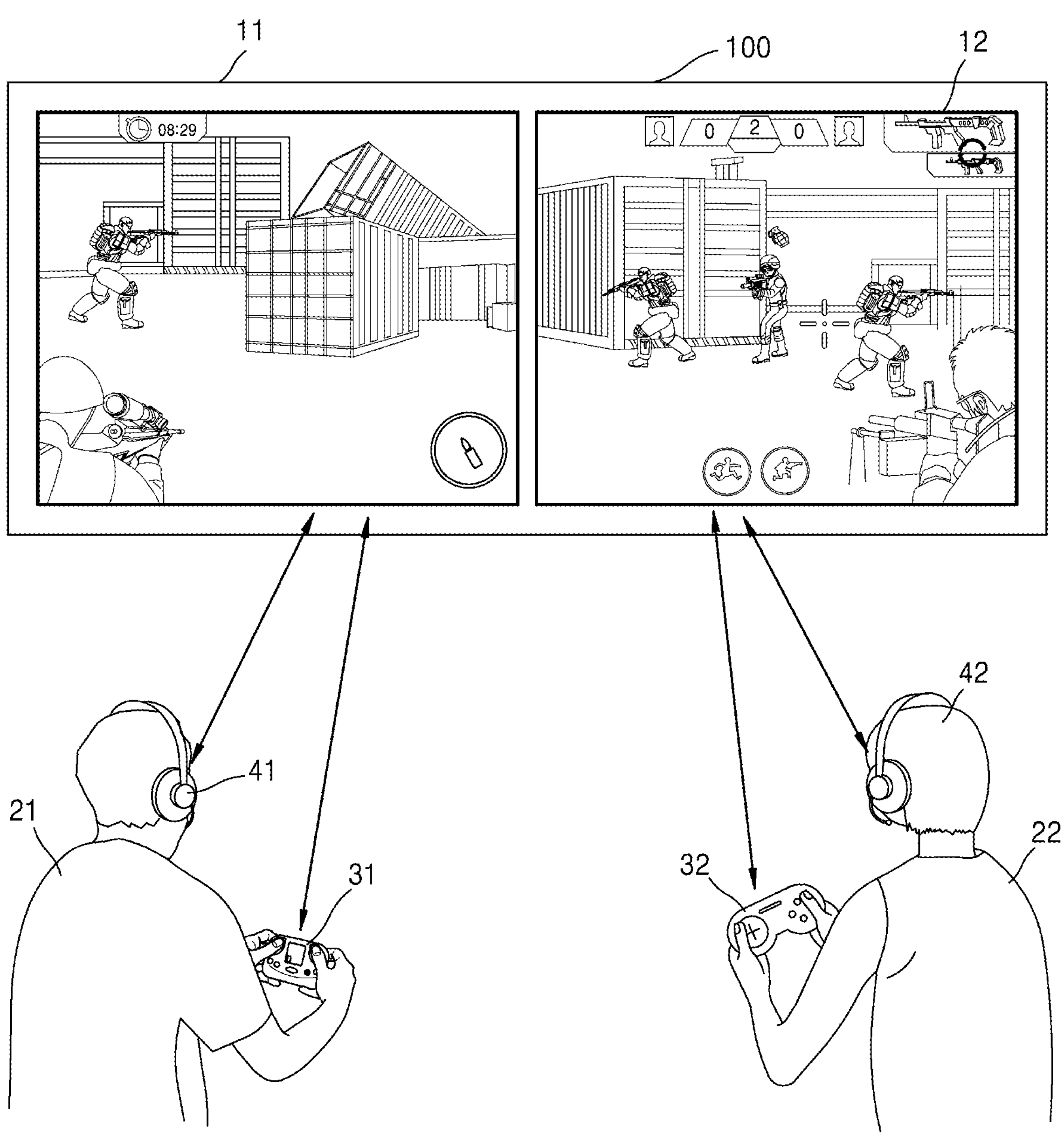
FIG. 1 is a reference diagram for describing an aspect of using game content through a display apparatus such as a TV, according to the related art.

The terminology used herein will be described briefly, and the disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be further understood that the terms "comprises" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

Hereinafter, the disclosure will be described in detail with reference to accompanying drawings to the extent that one of ordinary skill in the art would be able to carry out the disclosure. However, the disclosure may be implemented in various manners, and is not limited to the embodiment of the disclosure described herein. In addition, components irrelevant with the description are omitted in the drawings for clear description, and like reference numerals are used for similar components throughout the entire specification.

In the embodiment of the disclosure, the term “user” denotes a person controlling functions or operations of a computing device or an electronic device by using a control device, and may include a viewer, a manager, or an installation technician.

Terminology such as “at least one of A and B”, as may be used herein, includes any of the following: A, B, A and B. Terminology such as “at least one of A, B, and C”, as may be used herein, includes any of the following: A, B, C, A and B, A and C, B and C, A and B and C.

Similarly, terminology such as “at least one of A or B”, as may be used herein, includes any of the following: A, B, A and B. Terminology such as “at least one of A, B, or C”, as may be used herein, includes any of the following: A, B, C, A and B, A and C, B and C, A and B and C.

FIG. 1 is a reference diagram for describing an aspect of using game content through a display apparatus such as a TV, according to the related art.

Referring to FIG. 1, a display apparatus 100 may provide a multi-window function, in which a display screen is partitioned into a plurality of windows and content is displayed on each of the plurality of partitioned windows. The multi-window function may be referred to as a multi-view function. The display apparatus 100 may partition the display screen into two or more windows in order to provide the multi-window function. The partitioned window may be referred to as a view or a sub-screen. For example, the display apparatus 100 may partition the display screen into two windows, three windows, four windows, etc. The display apparatus 100 may partition the display screen into the plurality of windows in order to provide the multi-window function, and moreover, may determine a size of each window variously and a layout of each window variously. For example, the display apparatus 100 of FIG. 1 partitions the display screen into two windows, that is, a first window 11 and a second window 12 to provide the multi-window function.

The display apparatus 100 may independently display different pieces of content through respective windows of the multi-window. The same content may be also displayed on each window of the multi-window according to a selection of a user. Each window of the multi-window may be controlled by a separate remote-control device, and audio data corresponding to content displayed on each window may be output through a separate audio output device. For example, referring to FIG. 1, the first window 11 is controlled by a first user 21 via a first controller 31, and audio data corresponding to the content displayed on the first window 11 may be output through a first audio input/output device 41. The second window 12 is controlled by a second user 22 via a second controller 32, and audio data corresponding to content displayed on the second window 12 may be output through a second audio input/output device 42.

In an example, when the content is displayed on the first window 11 and the second window 12 independently from each other, the audio data corresponding to the content is also independent from each other. Thus, the display apparatus 100 may output first audio data corresponding to first content through the first audio input/output device 41. Also, the display apparatus 100 may output second audio data corresponding to second content via the second audio input/output device 42. In this case, the first audio data and the second audio data are independent from each other, and there is no synchronization issue. For example, the first window 11 may display a broadcasting program and the second window 12 may display game content.

According to an embodiment, when the same content is displayed on the first window 11 and the second window 12, there may be a synchronization issue of audio data. When the same content is displayed on the first window 11 and the second window 12, the display apparatus 100 may mix the audio data corresponding to the content displayed on the first window 11 with the audio data corresponding to the content displayed on the second window 12 and may output the mixed audio data respectively through the first audio input/output device 41 and the second audio input/output device 42. For example, in the case of a real-time bi-directional service content such as game content, even when the first user and the second user play the same game content, the first and second users may play in different places or different scenes in the same content. Therefore, in this case, the content images displayed on the first window and the second window may be different from each other, and accordingly, the audio data output corresponding to the first window and the audio data output corresponding to the second window may be different from each other. For example, when the first window 11 of the display apparatus 100 displays a first image of the game content and the second window 12 of the display apparatus 100 displays a second image of the game content, the display apparatus 100 mixes the first audio data output in correspondence with the first window 11 with the second audio data output in correspondence with the second window 12 and outputs the mixed audio data through the first audio input/output device 41 and the second audio input/output device 42. Here, the display apparatus 100 may output the audio data that is mixed based on Bluetooth profile dedicated for audio transfer. When one of the first user and the second user, e.g., the second user, uses the voice call function, an additional Bluetooth profile for bi-directional voice call, not the Bluetooth profile dedicated for the audio transfer, has to be used for performing the voice call function. Therefore, the display apparatus 100 outputs the audio data mixed by using the audio-dedicated Bluetooth profile through the first audio input/output device, and has to output the audio data mixed by using Bluetooth profile for bi-directional voice call and voice call sound through the second audio input/output device. However, the data transferred by using the Bluetooth profile dedicated for the audio transfer and the data transferred by using Bluetooth profile for the bi-directional voice call are different from each other in transfer speed thereof, and thus, the audio data that the first and second users listen to need to be synchronized.

According to an embodiment, the display apparatus 100 may use a delay unit for synchronizing the audio data transferred by using the Bluetooth profile dedicated for the audio transfer with the audio data transferred by using the Bluetooth profile for bi-directional voice call. According to an embodiment, the display apparatus 100 may use a buffer as a delay unit.

According to an embodiment, the display apparatus 100 may adjust a delay time in the buffer for synchronizing the audio data transferred by using the Bluetooth profile dedicated for the audio transfer with the audio data transferred by using the Bluetooth profile for bi-directional voice call.

According to an embodiment, the display apparatus 100 provides a graphical user interface for allowing the delay time to be adjusted in the synchronization buffer, and may adjust the delay time in the synchronization buffer based on a user input received through the graphical user interface.

Figure 2:
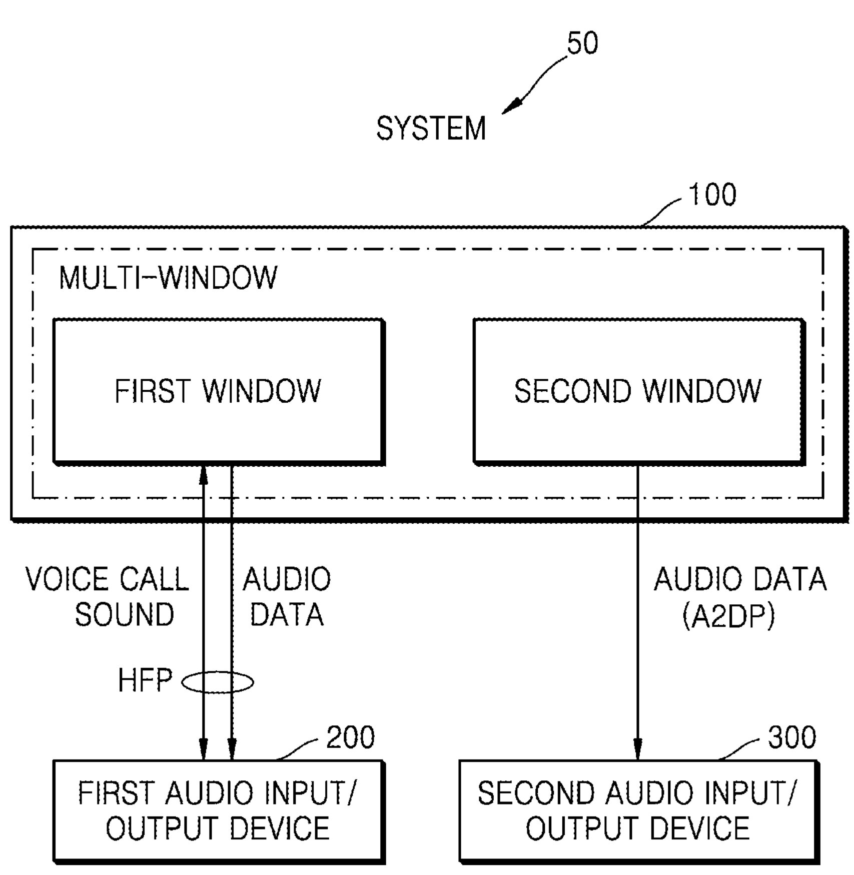
FIG. 2 is a diagram showing an example of a system 50 including a display apparatus 100, a first audio input/output device 200, and a second audio input/output device 300, according to an embodiment.

FIG. 2 is a diagram showing an example of a system 50 including the display apparatus 100, a first audio input/output device 200, and a second audio input/output device 300 according to an embodiment.

Referring to FIG. 2, the system 50 may include the display apparatus 100 displaying content, and the first audio input/output device 200 and the second audio input/output device 300 that communicate with the display apparatus 100 by connecting to the display apparatus according to Bluetooth communication protocol.

The display apparatus 100 may denote an apparatus that includes a display and displays image content, video content, game content, graphic content, etc. The display apparatus 100 may output or display images or content received from an external input device or a server computer. The display apparatus 100 may include various types of electronic devices that may receive and output content, for example, a network television (TV), a smart TV, an Internet TV, a Web TV, an internet protocol (IP) TV, a personal computer (PC), and a smartphone. The display apparatus 100 may be referred to as the display apparatus in an aspect of receiving and displaying content, and otherwise, may be referred to as a content receiving apparatus, an electronic device, a computing device, etc.

According to an embodiment, the display apparatus 100 may provide a multi-window function, in which a display screen is partitioned into a plurality of windows and different pieces of content may be displayed on respective windows. The multi-window may be referred to as a multi-view. Each of the windows included in the multi-window may be referred to as a view or a sub-screen. The plurality of windows included in the multi-window may be two, three, four, etc. Sizes of the plurality of windows included in the multi-window may be variously determined, and arrangement of the plurality of windows may be variously determined. In addition, in the case of a picture-in-picture (PIP) in which a small sub-screen is overlaid on at least part of the display screen, the method according to the disclosure may be applied. In FIG. 2, the multi-window includes a first window and a second window, and hereinafter, it is described that the multi-window includes the first window and the second window, but the multi-window may include more windows.

The audio input/output device may denote a device that may output and input audio data. In detail, the audio input/output device may denote a device including a speaker for outputting audio data and a microphone for inputting audio data. For example, the audio input/output device may communicate with the display apparatus 100 via wires or wirelessly. In the example, the first audio input/output device 200 and the second audio input/output device 300 may communicate with the display apparatus 100 by using a Bluetooth communication protocol.

The display apparatus 100 may be connected to one or more audio input/output devices and may output audio data corresponding to the content displayed on the display to the audio input/output device connected thereto. In order to display the content on the plurality of windows through the multi-window, the display apparatus 100 may connect communication with the plurality of audio input/output devices. The display apparatus 100 may connect communication with the first audio input/output device 200 in order to output first audio data corresponding to first content displayed on the first window. The display apparatus 100 may connect communication with the second audio input/output device 300 in order to output second audio data corresponding to the second content displayed on the second window. The display apparatus 100 may be connected to the first audio input/output device 200 and the second audio input/output device 300 by using various communication protocols. For example, the display apparatus 100 may be connected to the first audio input/output device 200 and the second audio input/output device 300 by using Bluetooth communication protocol.

According to an embodiment, the display apparatus 100 may display different pieces of content on the first window and the second window. For example, the display apparatus 100 may display the first content on the first window and display the second content on the second window. In this case, when the first audio input/output device 200 and the second audio input/output device 300 are connected to the display apparatus 100, the display apparatus 100 may output first audio data corresponding to the first content through the first audio input/output device 200 and output second audio data corresponding to the second content through the second audio input/output device 300. In this case, because the first content and the second content are independent from each other, the first audio data and the second audio data may be independently output through the first audio input/output device 200 and the second audio input/output device 300 by using Bluetooth communication protocol, respectively.

According to an embodiment, the display apparatus 100 may display different content on the first window and the second window. For example, the display apparatus 100 may display the first content on the first window and display the second content on the second window. In this case, when the first audio input/output device 200 and the second audio input/output device 300 are connected to the display apparatus 100, the display apparatus 100 may output first audio data corresponding to the first content through the first audio input/output device 200 and output second audio data corresponding to the second content through the second audio input/output device 300. In this case, because the first content and the second content are independent from each other, there is no synchronization issue between the first audio data and the second audio data in the display apparatus 100. Therefore, the display apparatus 100 may output the first audio data and the second audio data to the first audio input/output device 200 and the second audio input/output device 300 by using the Bluetooth communication protocol, respectively.

According to an embodiment, the display apparatus 100 may display the same content, e.g., the first content, on the first window and the second window. The first content may include real-time bi-directional service content. The real-time bi-directional service content may include, for example, game content, etc. In this case, the first window and the second window may display different images or scenes of the first content. For example, the first window may display a first image included in the first content and the second window may display a second image included in the first content. For example, when the first content is roll-playing game content played by multi-users such as a massive multiuser online role-playing game (MMORPG), for example, the first window may display an image corresponding to a first pace of the first content (e.g., first image) according to control from a first user and the second window may display an image corresponding to a second place of the first content (e.g., second image) according to control from a second user. Therefore, the first audio data corresponding to the first image and the second audio data corresponding to the second image may be different from each other, but the images displayed on the first window and the second window are both from the same first content. Therefore, because all the users have to experience the same situation as in one space, both the first user and the second user may listen to the first audio data and the second audio together. Therefore, the display apparatus 100 may mix the first audio data corresponding to the first image and the second audio data corresponding to the second image, and may output the mixed audio data to the first audio input/output device 200 and the second audio input/output device 300. The display apparatus 100 may use a Bluetooth profile dedicated for audio transfer, in order to output the mixed audio data to the first audio input/output device 200 and the second audio input/output device 300. The Bluetooth profile dedicated for audio transfer may include, for example, advanced audio distribution profile (A2DP).

As described above, when the first user, for example, selects to use a voice call service while the display apparatus 100 transfers the mixed audio data to the first audio input/output device 200 and the second audio input/output device 300 via the Bluetooth profile dedicated for audio transfer, the display apparatus 100 may use a Bluetooth profile dedicated for voice call in order to provide the first audio input/output device 200 with the mixed audio data and voice call sound along with each other. However, the Bluetooth profile dedicated for voice call and the Bluetooth profile dedicated for audio transfer differ from each other in view of data transmission speed thereof, and thus, the transfer speed of the audio data transferred to the first audio input/output device 200 and the transfer speed of the audio data transferred to the second audio input/output device 300 may be different from each other. However, because the first user and the second user both play the first content, there is a difference between the audio data that the first user and the second user listen to when the transfer speed of the audio data transferred to the first audio input/output device 200 and the transfer speed of the audio data transferred to the second audio input/output device 300, and thus, it is necessary to complement the difference.

Therefore, the display apparatus 100 according to the embodiment may include a unit for synchronizing the voice call sound and the audio data output in correspondence with the first window and the audio data output in correspondence with the second window. In detail, the display apparatus 100 may include a delay unit, for example, a delay buffer, which delays the output of the audio data that is output in correspondence with the second window, in order to synchronize the voice call sound and the audio data output in correspondence with the first window with the audio data output in correspondence with the second window.

According to the embodiment, the display apparatus 100 may adjust a delayed degree of the delay unit that delays the output of the audio data output in correspondence with the second window, in order to synchronize the voice call sound and the audio data output in correspondence with the first window with the audio data output in correspondence with the second window. Also, according to the embodiment, the display apparatus 100 may provide a graphical user interface through which the delayed degree of the delay unit may be set, and receives a user input as to the delayed degree through the graphical user interface and sets the delayed degree.

The display apparatus 100 may provide a service, e.g., a watch together service. The watch together service may indicate a service by which users at remote places may watch the same content through the display apparatus of their own and may use the voice call service while watching the content. For example, the first user and a third user may watch the same content through the watch together service, and the second user may watch the content on a single window of the display apparatus 100 together with the first user. Here, the display apparatus 100 may display the content on a single screen, and may output the audio data corresponding to the content to the first audio input/output device of the first user and to the second audio input/output device of the second user. Here, the first user may use the voice call function. In this case, the display apparatus 100 may output the audio data to the second audio input/output device that only receives the audio data via the Bluetooth profile dedicated for the audio transfer, and may output the audio data and the voice call sound to the first audio input/output device using the voice call function via the Bluetooth profile dedicated for the voice call. In this case, the display apparatus 100 may use different Bluetooth profiles with respect to the audio data of the same content, and there may be a time difference between the audio data that the first user and the second user listen to. Because the first user and the second user watch the same screen, the transfer speed of the audio data has to be identical for natural screen watching, but there may be a time difference due to the voice call function. Therefore, the display apparatus 100 may use the delay unit described above, for synchronizing the audio data output through the first audio input/output device with the audio data output through the second audio input/output device.

Figure 3:
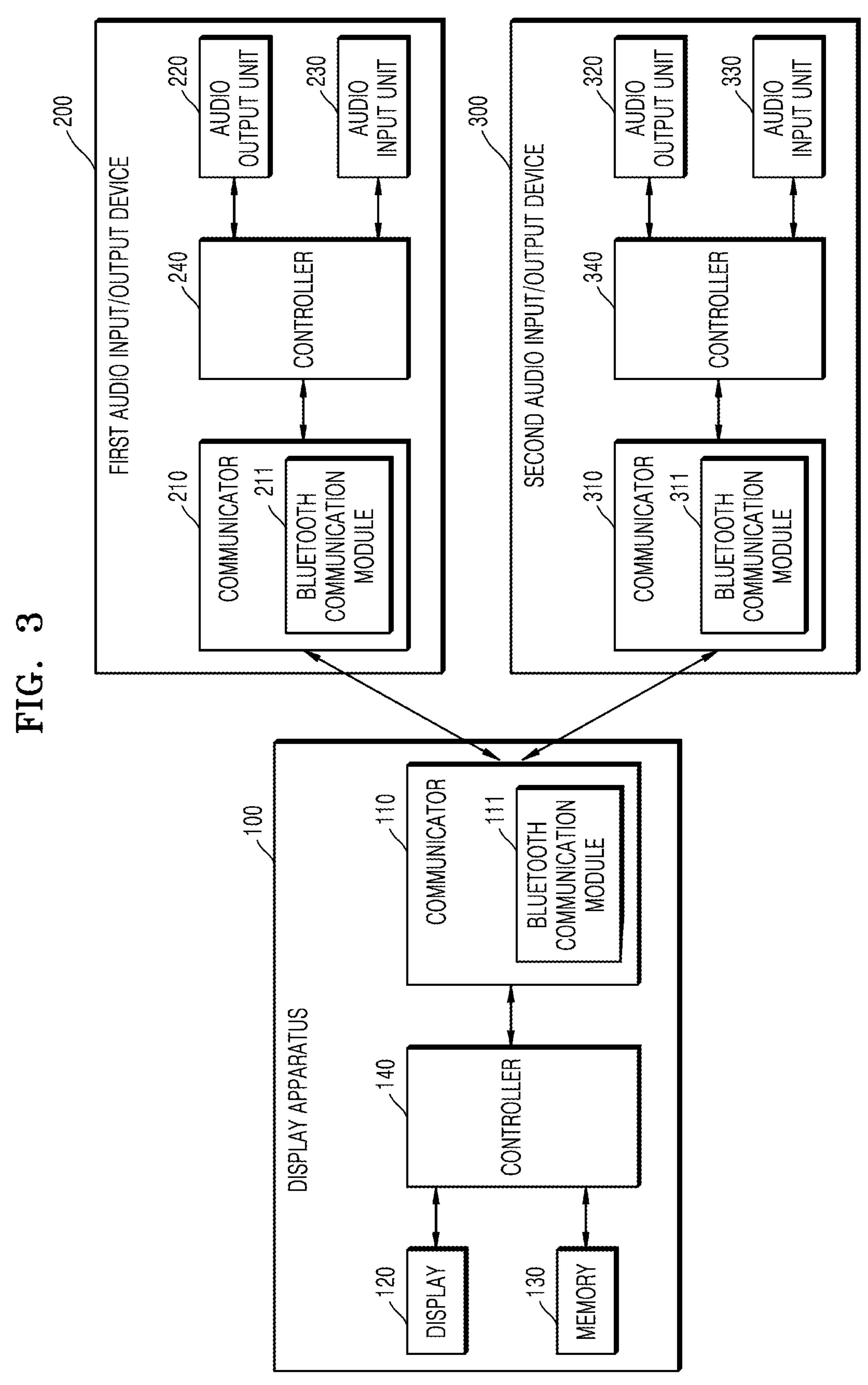
FIG. 3 is a block diagram of a display apparatus, a first audio input/output device, and a second audio input/output device, according to an embodiment.

FIG. 3 is a block diagram of a display apparatus, a first audio input/output device, and a second audio input/output device according to an embodiment.

Referring to FIG. 3, the display apparatus 100 may include a communicator 110, a display 120, a memory 130, and a controller 140.

The communicator 110 may include one or more modules enabling wireless communication between the display apparatus 100 and a wireless communication system or between the display apparatus 100 and a network in which another electronic device is located.

According to an embodiment, the communicator 110 may include a Bluetooth communication module performing communication according to Bluetooth communication protocol. The Bluetooth communication module may transmit/receive data to/from a Bluetooth communication module of the first audio input/output device 200 and a Bluetooth communication module of the second audio input/output device 300.

According to an embodiment, a Bluetooth communication module 111 may output audio data to at least one of a Bluetooth communication module 211 and a Bluetooth communication module 311 according to the Bluetooth profile dedicated for audio transfer, according to the control from the controller 140.

According to an embodiment, the Bluetooth communication module 111 may output voice call sound to at least one of the Bluetooth communication module 211 and the Bluetooth communication module 311 according to the Bluetooth profile dedicated for the voice call service, according to the control from the controller 140.

According to an embodiment, the Bluetooth communication module 111 may output voice call sound mixed with audio data to at least one of the Bluetooth communication module 211 and the Bluetooth communication module 311 according to the Bluetooth profile dedicated for the voice call service, according to the control from the controller 140.

According to an embodiment, when the Bluetooth communication module 111 outputs the audio data to the Bluetooth communication module 211 of the first audio input/output device 200 according to the Bluetooth profile dedicated for voice call service and outputs the audio data to the Bluetooth communication module 311 of the second audio input/output device 300 according to the Bluetooth profile dedicated for the audio transfer under the control from the controller 140, the Bluetooth communication module 111 may output the audio data output according to the Bluetooth profile dedicated for the audio transfer after delaying the audio data by using the delay unit in order to synchronize the audio data output to the Bluetooth communication module 211 with the audio data output to the Bluetooth communication module 311.

The display 120 may receive and display content from a server computer or display content stored in the memory 130.

The memory 130 may store programs related to the operation of the display apparatus 100 and various data generated during the operation of the display apparatus 100.

The controller 140 is configured to execute one or more instructions stored in the memory 130 to control overall operations of the display apparatus 100.

According to an embodiment, the controller 140 is configured to execute one or more instructions to identify that the first audio input/output device and the second audio input/output device through which the audio data is to be output by using the Bluetooth communication protocol are connected, and then identifies that Bluetooth communications for outputting the audio data through the first audio input/output device and the second audio input/output device use different Bluetooth communication profiles. Accordingly, in order to synchronize the audio data output through the first audio input/output device with the audio data output through the second audio input/output device, the controller 140 may control the communication interface to delay the audio data output through one of the first audio input/output device and the second audio input/output device for a preset time by using the synchronization buffer and then output the audio data.

According to an embodiment, the controller 140 is configured to execute one or more instructions to control the display the first image of the first content on the first window and display the second image of the first content on the second window in the multi-window including the first and second windows and mixes the first audio data corresponding to the first image and the second audio data corresponding to the second image, so as to obtain the audio data.

According to an embodiment, the controller 140 is configured to execute one or more instructions to control the communication interface to process the audio data according to the A2DP Bluetooth profile in order to output the audio data to the first audio input/output device, and to control the communication interface to process the mixing data of the audio data and the voice call sound according to a hands-free profile (HFP) Bluetooth profile in order to output the voice call sound to the second audio input/output device along with the audio data.

According to an embodiment, the controller 140 is configured to execute one or more instructions to control the communication interface to delay the mixing data processed according to the HFP Bluetooth profile for the preset time period by using the synchronization buffer, for the synchronization of the audio data processed according to the A2DP Bluetooth profile with the mixing data processed according to the HFP Bluetooth profile.

According to an embodiment, a predetermined size of the synchronization buffer may correspond to a size of a buffer provided in the first audio input/output device.

According to an embodiment, the controller 140 is configured to execute one or more instructions to control the display to display the graphical user interface allowing the user to adjust the delay time of the synchronization buffer, and then, to adjust the delay time of the synchronization buffer according to the user input received through the graphical user interface.

According to an embodiment, the controller 140 is configured to execute one or more instructions to control the display to display the first content and obtain the audio data corresponding to the first content.

According to an embodiment, the controller 140 is configured to execute one or more instructions to control the communication interface to process the audio data according to the A2DP Bluetooth profile in order to output the audio data to the first audio input/output device, and to control the communication interface to process the mixing data of the audio data and the voice call sound according to an HFP Bluetooth profile in order to output the voice call sound to the second audio input/output device along with the audio data.

According to an embodiment, the controller 140 is configured to execute one or more instructions to control the communication interface to delay the mixing data processed according to the HFP Bluetooth profile for the preset time period by using the synchronization buffer, for the synchronization of the audio data processed according to the A2DP Bluetooth profile with the mixing data processed according to the HFP Bluetooth profile.

The first audio input/output device 200 and the second audio input/output device 300 may connect communication with the display apparatus 100 to transmit/receive audio data. In particular, when an operation corresponding to the voice call function, the first audio input/output device 200 or the second audio input/output device 300 may further receive voice call sound in addition to the audio data.

The first audio input/output device 200 may include a communicator 210, an audio output unit 220, an audio input unit 230, and a controller 240.

The communicator 210 may include one or more modules enabling wireless communication between the first audio input/output device 200 and a wireless communication system or between the first audio input/output device 200 and a network in which another electronic device is located.

According to an embodiment, the communicator 210 may include a Bluetooth communication module 211 performing communication according to Bluetooth communication protocol. The Bluetooth communication module 211 may transmit/receive data to/from the Bluetooth communication module 111 of the display apparatus 100 according to the Bluetooth communication protocol.

The audio output unit 220 may output audio data processed in the first audio input/output device 200. In particular, the audio output unit 220 may output the audio data received from the display apparatus 100 via the Bluetooth communication protocol. The audio output unit 220 may include, for example, a speaker.

The audio input unit 230 may receive audio data from outside to provide the controller 240 with the audio data. The audio input unit 230 may include, for example, a microphone.

The controller 240 may control overall operations of the first audio input/output device 200.

The second audio input/output device 300 may include a communicator 310, an audio output unit 320, an audio input unit 330, and a controller 340.

The communicator 310 may include one or more modules enabling wireless communication between the second audio input/output device 300 and a wireless communication system or between the second audio input/output device 300 and a network in which another electronic device is located.

According to an embodiment, the communicator 310 may include a Bluetooth communication module 311 performing communication according to Bluetooth communication protocol. The Bluetooth communication module 311 may transmit/receive data to/from the Bluetooth communication module 111 of the display apparatus 100 according to the Bluetooth communication protocol.

The audio output unit 320 may output audio data processed in the second audio input/output device 300. In particular, the audio output unit 320 may output the audio data received from the display apparatus 100 via the Bluetooth communication protocol. The audio output unit 320 may include, for example, a speaker.

The audio input unit 330 may receive audio data from outside to provide the controller 340 with the audio data. The audio input unit 330 may include, for example, a microphone.

The controller 340 may control overall operations of the second audio input/output device 300.

Figure 4:
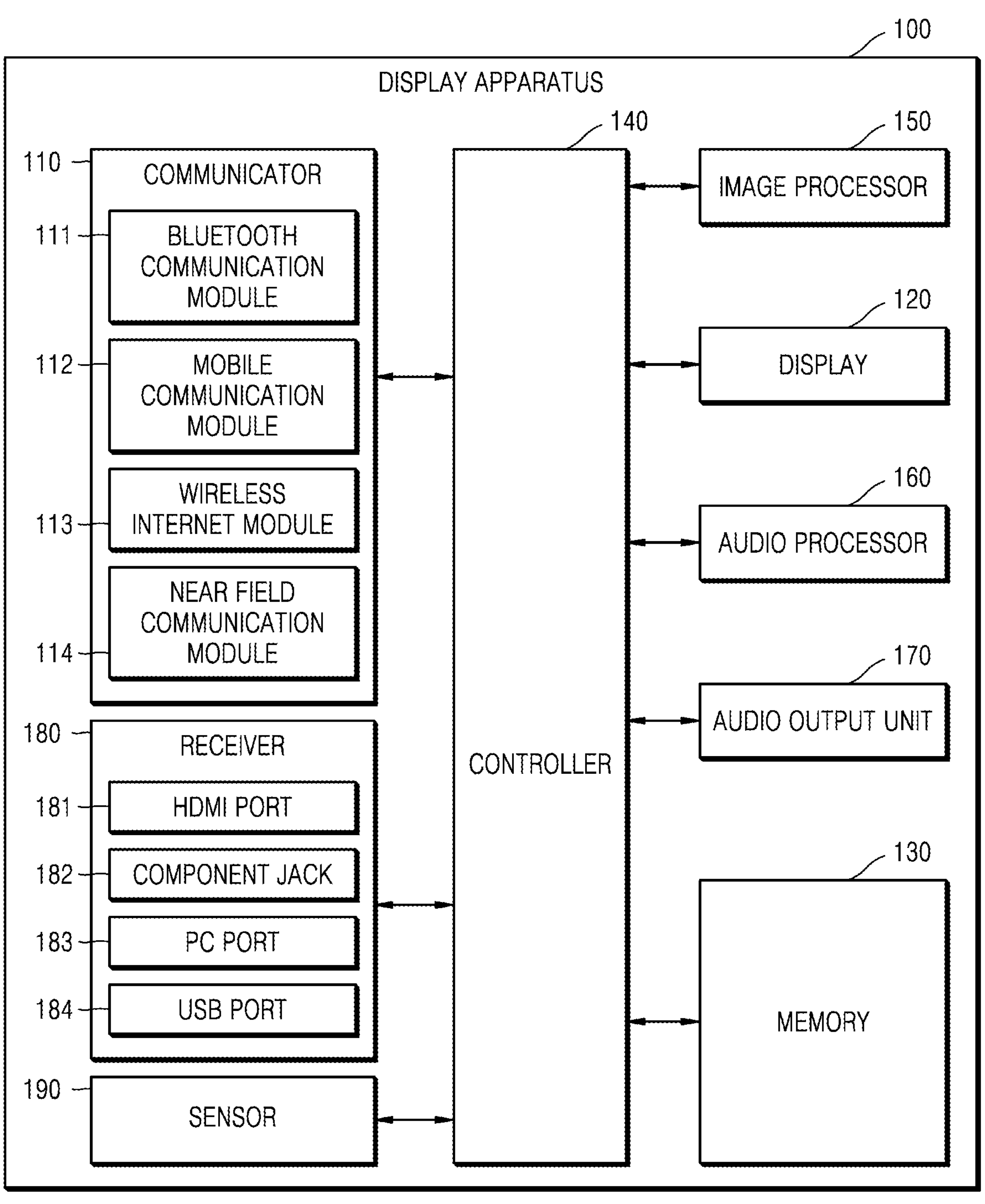
FIG. 4 is a block diagram showing a display apparatus 200 according to an embodiment of the disclosure in detail.

FIG. 4 is a block diagram showing a display apparatus 100 according to an embodiment of the disclosure in detail.

Referring to FIG. 4, the display apparatus 100 may further include an image processor 150, an audio processor 160, an audio output unit 170, a receiver 180, and a sensor 190, in addition to the communicator 110, the display 120, the memory 130, and the controller 140.

The communicator 110 may include one or more modules enabling wireless communication between the display apparatus 100 and a wireless communication system or between the display apparatus 100 and a network in which another electronic device is located. For example, the communicator 110 may include the Bluetooth communication module 111, a Wi-Fi communication module 112, a mobile communication module 113, and a wireless internet module 114.

The Bluetooth communication module 111 may perform Bluetooth communication connection to the first audio input/output device 200 and the second audio input/output device 300 and may perform communication according to the Bluetooth communication protocol.

The mobile communication module 112 may transmit/receive a wireless signal to/from at least one of a base station, an external terminal, and a server on a mobile communication network. The wireless signal may include a voice call signal, a video call signal, or various types of data according to transmission/reception of texts/multimedia messages.

The wireless internet module 113 is a module for accessing wireless Internet, and may be built in or out of the device. As a wireless Internet technology, wireless LAN (WLAN), Wi-Fi, wireless broadband (Wibro), world interoperability for microwave access (Wimax), high speed downlink packet access (HSDPA), etc. may be used.

The near field communication module 114 denotes a module for performing near field communication. Examples of the near field communication technology may include Bluetooth, Bluetooth low energy (BLE), radio frequency identification (RFID), infrared data association (IrDA), ultra-wideband (UWB), ZigBee, etc.

The image processor 150 may process the image signal transmitted from the receiver 180 or the communicator 110 and output the signal to the display 120, according to the control from the controller 140.

The display 110 may display the image signal transmitted from the image processor 150 on a screen.

The audio processor 160 may convert an audio signal transmitted from the receiver 180 or the communicator 110 into an analog audio signal and output the signal to the audio output unit 170, according to the control from the controller 140.

The audio output unit 170 may output the analog audio signal through a speaker.

The receiver 180 may receive an image signal and an audio signal received from an external input device according to a connected protocol based on the control by the controller 140, and then, may output the signals to the image processor 150 and the audio processor 160.

The receiver 180 may receive a video (e.g., moving picture, etc.), audio (e.g., voice, music, etc.), and additional information (e.g., EPG, etc.) from the outside of the display apparatus 100 according to the control from the controller 140. The receiver 180 may include one of an HDMI port 181, a component jack 182, a PC port 183, and a USB port 184, or a combination of one or more thereof. The receiver 180 may further include a display port (DP), a thunderbolt, a mobile high-definition link (MHL), in addition to the HDMI port.

The memory 130 may store programs related to the operation of the display apparatus 100 and various data generated during the operation of the display apparatus 100.

Figure 5:
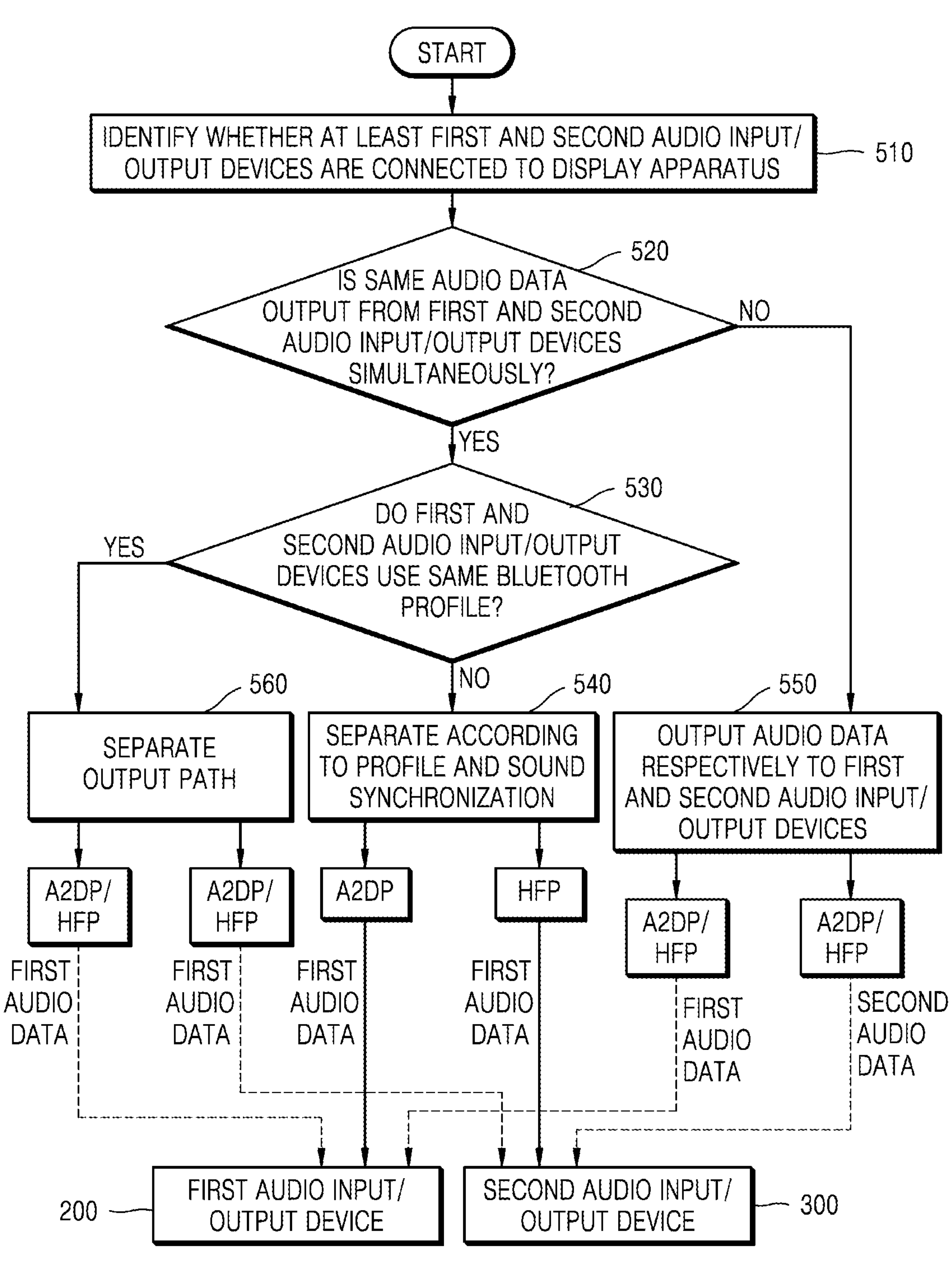
FIG. 5 is a flowchart illustrating an operation method of a display apparatus, according to an embodiment.

FIG. 5 is a flowchart illustrating a method of operating a display apparatus, according to an embodiment.

Referring to FIG. 5, in operation 510, the display apparatus 100 may identify that at least the first audio input/output device 200 and the second audio input/output device 300 are connected to the display apparatus 100.

In detail, the display apparatus 100 may identify that at least the first audio input/output device 200 and the second audio input/output device 300 are connected to the display apparatus 100 via the Bluetooth communication connection.

The display apparatus 100 and the first audio input/output device 200 may perform pairing and connecting operations for Bluetooth communication in advance. Bluetooth pairing may indicate, between two devices attempting Bluetooth communication, providing their information first, to authenticate each other and define agreement for the Bluetooth communication connection. When performing the Bluetooth pairing, the display apparatus 100 and the first audio input/output device 200 may store Bluetooth pairing information. When the Bluetooth pairing information is stored, the display apparatus 100 and the first audio input/output device 200 may connect to each other by using the stored pairing information without exchanging information for authenticating each other when performing the Bluetooth connection. The display apparatus 100 and the second audio input/output device 300 may perform Bluetooth connection according to the above method.

The display apparatus 100 may identify whether two or more different audio input/output devices, e.g., the first audio input/output device 200 and the second audio input/output device 300, are connected to the display apparatus 100.

In operation 520, the display apparatus 100 may determine whether the same audio data is output to the first audio input/output device and the second audio input/output device. Here, the same audio data may denote one piece of audio data corresponding to the content displayed on a single screen, and moreover, may include mixed audio data obtained by mixing different audio data corresponding to the multi-window.

The display apparatus 100 may output the different audio data to each of the first audio input/output device and the second audio input/output device. In detail, the display apparatus 100 may provide the multi-window on the display screen, and may output to the first audio input/output device the first audio data corresponding to the first content displayed on the first window of the multi-window and output to the second audio input/output device the second audio data corresponding to the second content displayed on the second window. For example, when a user selects the multi-view system provided on the display apparatus 100 by using a certain button of a remote controller, the display apparatus 100 may provide the display screen as the multi-window and display different content on respective windows of the multi-window. For example, the user may control the display apparatus 100 to display a broadcasting program on one window of the multi-window and display game content on another window of the multi-window provided by the display apparatus 100.

The display apparatus 100 may output the same audio data to each of the first audio input/output device and the second audio input/output device. In detail, the display apparatus 100 may display the first content on the display screen, and may output the first audio data corresponding to the first content to the first audio input/output device and the second audio input/output device. For example, when the display apparatus 100 displays one piece of content, e.g., movie and two users listen to the audio data of the movie via the Bluetooth headsets of their own, the display apparatus 100 may simultaneously output the first audio data corresponding to the first content displayed on the screen to the first audio input/output device and the second audio input/output device.

The display apparatus 100 provides the multi-window on the display screen and displays the first content on both the first and second windows of the multi-window, but according to the user's control, the first image of the first content may be displayed on the first window and the second image of the first content may be displayed on the second window. For example, when the first content is game content, the display apparatus 100 may display the first image corresponding to a first place of the game content on the first window and display the second image corresponding to a second place of the game content on the second window according to the user's control. In this case, the images displayed on the first and second windows are different from each other but both correspond to the first content, and thus, the first audio data corresponding to the first image and the second audio data corresponding to the second image are mixed and then the mixed audio data may be simultaneously output to the first audio input/output device and the second audio input/output device.

In operation 520, when it is determined that the same audio data is not simultaneously output to the first audio input/output device and the second audio input/output device as a result of determining whether the same audio data is simultaneously output to the first audio input/output device and the second audio input/output device, the display apparatus 100 may proceed to operation 550.

In operation 550, the display apparatus 100 may output the audio data respectively to the first audio input/output device and the second audio input/output device. For example, the display apparatus 100 may output to the first audio input/output device the first audio data corresponding to the first content displayed on the first window of the multi-window and output to the second audio input/output device the second audio data corresponding to the second content displayed on the second window. In this case, the pieces of content displayed on respective windows are different from each other, and thus, the display apparatus 100 may independently output the first audio data and the second audio data.

The display apparatus 100 may transfer the audio data to the audio input/output device via various Bluetooth profiles. When the audio data to be transferred is content audio stream transferred in one direction, the display apparatus may transfer the audio data by using the A2DP Bluetooth profile. When the audio data to be transferred is bi-directional voice sound through a voice call service, the display apparatus may transfer the audio data by using the HFP Bluetooth profile. When the user selects the voice call service while using the content such as a movie or a game, the display apparatus 100 has to transfer the audio stream corresponding to the content and the bi-directional voice sound, and the display apparatus 100 may transfer the audio stream and the voice sound by using the HFP Bluetooth profile. When the display apparatus 100 outputs the audio data independently to the first audio input/output device and the second audio input/output device, the output operations may be independently performed and do not affect each other. Therefore, the display apparatus 100 may perform the audio output operation by using the same Bluetooth profile or may perform the audio output operation by using different Bluetooth profiles. For example, the display apparatus 100 may output the first audio data to the first audio input/output device by using the HFP Bluetooth profile and output the second audio data to the second audio input/output device by using the A2DP Bluetooth profile.

In operation 520, when it is determined that the same audio data is simultaneously output to the first audio input/output device and the second audio input/output device as a result of determining whether the same audio data is simultaneously output to the first audio input/output device and the second audio input/output device, the display apparatus 100 may proceed to operation 530.

In operation 530, the display apparatus 100 may determine whether the same Bluetooth profile is used to communicate with the first audio input/output device and the second audio input/output device. The display apparatus 100 may use the A2DP Bluetooth profile for exclusively transferring audio and may use the HFP Bluetooth profile for voice call service. For example, the display apparatus 100 may determine whether the A2DP or HFP is used as the Bluetooth profile for communicating with the first audio input/output device and the second audio input/output device, or one of the first and second audio input/output devices uses the A2DP and the other uses HFP.

When it is determined that the same Bluetooth profile is used as a result of determining whether the same Bluetooth profile is used to communicate with the first audio input/output device and the second audio input/output device, the display apparatus 100 may proceed to operation 570.

In operation 560, when the same audio data, e.g., the first audio data, is output to the first and second audio input/output devices by using the same Bluetooth profile, the display apparatus 100 may separate an output path of the first audio data and then output the first audio data to the first audio input/output device 200 and the second audio input/output device 300. When the same Bluetooth profile is used, there is no difference in transfer speeds of the audio data output to the first and second audio input/output devices 200 and 300, and the output is performed as is.

For example, the display apparatus 100 may output the first audio data corresponding to the first content displayed on the display screen to the first and second audio input/output devices 200 and 300 by using the A2DP Bluetooth profile.

For example, when the first user and the second user both select to use the voice call service while the display apparatus 100 displays the first content on the display screen, the outputs to both the first audio input/output device 200 and the second audio input/output device 300 have to use the HFP Bluetooth profile, and thus, the display apparatus 100 may output the first audio data corresponding to the first content to the first audio input/output device 200 and the second audio input/output device 300 by using the HFP Bluetooth profile.

In operation 530, when it is determined that the same Bluetooth profile is not used as a result of determining whether the same Bluetooth profile is used to communicate with the first audio input/output device and the second audio input/output device, the display apparatus 100 may proceed to operation 540.

In operation 540, the display apparatus 100 may perform the sound synchronization for each profile. In detail, because the same audio data is output to the first audio input/output device 200 and the second audio input/output device 300, the first user and the second user may naturally listen to the audio provided that the transfer speed of the audio data output to the first audio input/output device 200 and the transfer speed of the audio data output to the second audio input/output device 300 are equal to each other. However, when the output to the first audio input/output device 200 is performed by using the A2DP Bluetooth profile and the output to the second audio input/output device 300 is performed by using the HFP Bluetooth profile, there may be a difference in the transfer speeds. The A2DP is a profile generally for streaming a sound source, and thus, real-time property is not important and the buffering is performed in the audio output device in order to prevent discontinuity. The HFP is used in the function such as the phone call, and thus, the real-time property is important and the sound is output faster.

That is, in the case of the A2DP Bluetooth profile, a buffer for buffering exists in the audio output device, and there may be a delay in the audio output as compared with the HFP. In order to prevent the audio delay and synchronize the audio data, the display apparatus 100 may have a buffer like the buffer existing in the audio output device to generate a delay in the audio data output by using the HFP Bluetooth profile. As such, the audio data output by using the HFP and A2DP Bluetooth profiles may be synchronized.

Figure 6:
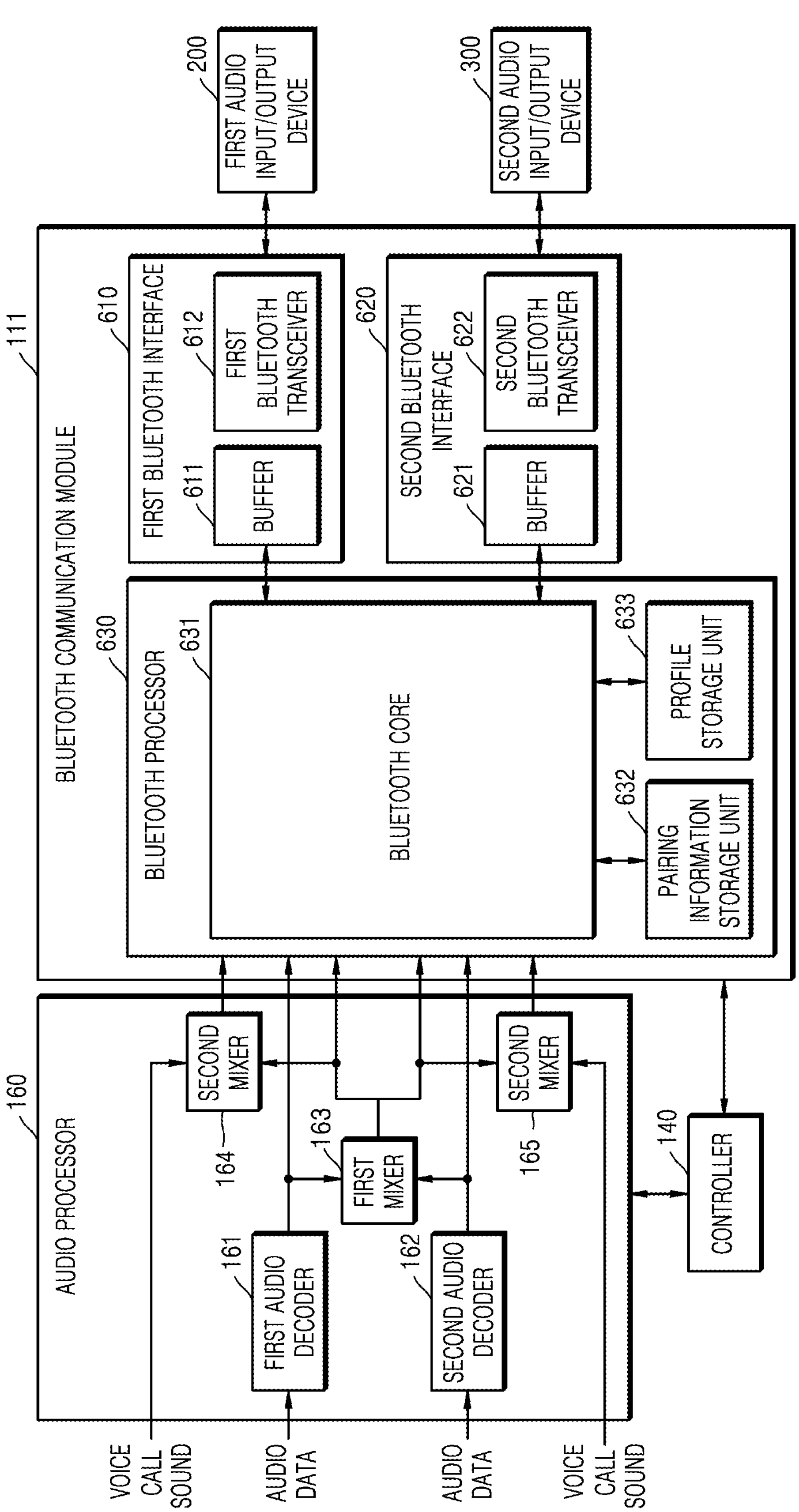
FIG. 6 is a diagram showing an example of a detailed structure of a portion of a display apparatus 100 for performing audio-data synchronization, according to an embodiment.

FIG. 6 is a diagram showing an example of a detail structure in some of a display apparatus 100 for performing audio-data synchronization, according to an embodiment.

Referring to FIG. 6, some of the display apparatus 100 may include the controller 140, the audio processor 160, and the Bluetooth communication module 111.

The controller 140 may perform the synchronization operation of the audio data output through the first audio input/output device 200 and the second audio input/output device 300 by controlling the audio processor 160 and the Bluetooth communication module 111.

The audio processor 160 receives audio data from various sources and performs processes including decoding, and then, may provide the processed audio data to the Bluetooth communication module 111.

The audio processor 160 may include a first audio decoder 161, a second audio decoder 162, a first mixer 163, a second mixer 164, and a third mixer 165. FIG. 6 shows two audio decoders, but the number of audio decoders may correspond to the number of the audio input/output devices that may be connected to the display apparatus. For example, when four audio input/output devices may be connected to the display apparatus 100, the audio processor 160 may include four audio decoders.

The first audio decoder 161 receives and decodes the first audio data, and may output decoded first audio data to the first mixer 163 or a first Bluetooth interface 610.

The second audio decoder 162 receives and decodes the second audio data, and then, may output decoded second audio data to the first mixer 163 or a second Bluetooth interface 620.

The first mixer 163 mixes the decoded first audio data received from the first audio decoder 161 and the decoded second audio data received from the second audio decoder 162, and may output the mixed audio data to the first Bluetooth interface 610 and the second Bluetooth interface 620. For example, when it is necessary to mix and output the first audio data from the first audio decoder 161 and the second audio data from the second audio decoder 162 to the audio input/output device, the first mixer 163 may perform the mixing operation.

The second mixer 164 may mix the mixed first audio data received form the first audio decoder 161 with the voice call sound, and may output the mixed data to the first Bluetooth interface 610. For example, when the user of the first audio input/output device 200 uses the voice call function, the second mixer 164 may mix the audio data output from the first audio decoder with the voice call sound.

The third mixer 165 may mix the mixed second audio data received form the second audio decoder 162 with the voice call sound, and may output the mixed data to the second Bluetooth interface 620. For example, when the user of the second audio input/output device 300 uses the voice call function, the third mixer 165 may mix the audio data output from the second audio decoder with the voice call sound.

The Bluetooth communication module 111 may include the first Bluetooth interface 610, the second Bluetooth interface 620, and a Bluetooth processor 630.

The Bluetooth processor 630 may include a Bluetooth core 631, a pairing information storage unit 632, and a profile storage unit 633.

The pairing information storage unit 632 may store pairing information required for the Bluetooth core to perform the Bluetooth communication with the audio input/output device. For example, the pairing information storage unit 632 may store the pairing information for performing Bluetooth communication with the first audio input/output device 200, and pairing information for performing Bluetooth communication with the second audio input/output device 300.

The profile storage unit 633 may store a plurality kinds of Bluetooth communication profiles. Some examples of different kinds of Bluetooth profiles include Advanced Audio Distribution Profile (A2DP), Audio/Video Control Transport Protocol (AVCTP), Audio/Video Distribution Transport Protocol (AVDTP), Audio/Video Remote Control Profile (AVRCP), Basic Imaging Profile (BIP), Basic Printing Profile (BPP), Common ISDN Access Profile (CIP), Cordless Telephony Profile (CTP), Dial-up Networking Profile (DUN), Extended Service Discovery Profile (ESDP), Fax Profile (FAX), File Transfer Profile (FTP), Generic Access Profile (GAP), General Audio/Video Distribution Profile (GAVDP), Generic Object Exchange Profile (GOEP), Hands-Free Profile (HFP), Hard Copy Cable Replacement Profile (HCRP), Headset Profile (HSP), Human Interface Device Profile (HID), Intercom Profile (ICP), Object Exchange (OBEX), Object Push Profile (OPP), Personal Area Networking Profile (PAN), RFCOMM, Service Discovery Protocol (SDP), Service Discovery Application Profile (SDAP), SIM Access Profile (SAP), Serial Port Profile (SPP), Synchronization Profile (SYNC), Telephony Control Specification (TCS-Binary or TCP), Video Distribution Profile (VDP), WAP Over Bluetooth Profile (WAP).

The Bluetooth core 631 stores protocol definition and communication firmware definition for performing Bluetooth communication according to the Bluetooth communication standards in an inner memory thereof, and when an audio format signal is received from the audio processor 160, the Bluetooth core 631 searches the profile storage unit 633 for a profile setting value (e.g., A2DP, HSF, HFP) corresponding to the received audio format signal, and converts the received audio format signal into the audio signal of the found profile and transfers the converted signal to the first Bluetooth interface 610 and/or the second Bluetooth interface 620.

For example, when receiving an audio format signal of the A2DP profile from the audio processor 160, the Bluetooth core 631 searches the profile storage unit 633 for the A2DP setting value, and converts the audio format signal of the A2DP profile into the audio signal of the A2DP profile and then output the converted signal.

For example, when receiving an audio format signal of the HFP profile from the audio processor 160, the Bluetooth core 631 searches the profile storage unit 633 for the HFP setting value, and converts the audio format signal of the HFP profile into the audio signal of the HFP profile and then output the converted signal.

The first Bluetooth interface 610 may interface the audio signal transmitted/received to/from the first audio input/output device 200.

The first Bluetooth interface 610 may include a first buffer 611 and a first Bluetooth transceiver 612.

The first buffer 611 temporarily stores the audio signal transferred/received through the first Bluetooth transceiver 612.

The first Bluetooth transceiver 612 may convert the audio signal input through an external audio input/output device, e.g., the first audio input/output device 200, into the audio format signal that may be processed by the Bluetooth core, or vice versa.

The second Bluetooth interface 620 may interface the audio signal transmitted/received to/from the second audio input/output device 300.

The second Bluetooth interface 620 may include a second buffer 621 and a second Bluetooth transceiver 622.

The second buffer 621 temporarily stores the audio signal transferred/received through the second Bluetooth transceiver 622.

The second Bluetooth transceiver 622 may convert the audio signal input through an external audio input/output device, e.g., the second audio input/output device 300, into the audio format signal that may be processed by the Bluetooth core, or vice versa.

When the same Bluetooth profile is used to format the audio data output through the first audio input/output device 200 and the audio data output through the second audio input/output device 300, there is no need to adjust the output speed of the audio data output through both devices, e.g., the first audio input/output device 200 and the second audio input/output device 300. However, when different Bluetooth profiles are used to format the audio data transferred/received to/from the first audio input/output device 200 and the second audio input/output device 300, there may be a difference in the output speed of the both devices. For example, in the case of the A2DP Bluetooth profile, a delay buffer is provided at the terminal of the audio input/output device for reproducing the audio data without discontinuity. Therefore, when different profiles are used in the circumstance in which the same audio data has to be simultaneously output to the first audio input/output device 200 and the second audio input/output device 300, there is a difference between the output speeds of the both devices. Thus, the audio data that the first user of the first audio input/output device 200 and the second user of the second audio input/output device 300 listen to at the same point in time may be different. Therefore, in order to compensate for the time difference, when one of the first and second audio input/output devices 200 and 300 communicates by using the A2DP profile and the other communicates by using the HFP profile, the Bluetooth 631 may process the audio data formatted by the HFP profile to be delayed to be output by using a buffer.

In the example shown in FIG. 6, the operation for performing the synchronization of the audio data may be performed by the Bluetooth communication module 111 according to the control from the controller 140 or may be performed solely by the Bluetooth communication module 111.

Hereinafter, various scenarios in which the audio data synchronization is performed by using the configuration of the display apparatus shown in FIG. 6 are described.

Referring to FIGS. 7 to 10, the audio synchronization operation in a case in which the display apparatus 100 displays the multi-user gam is described below.

Figure 7:
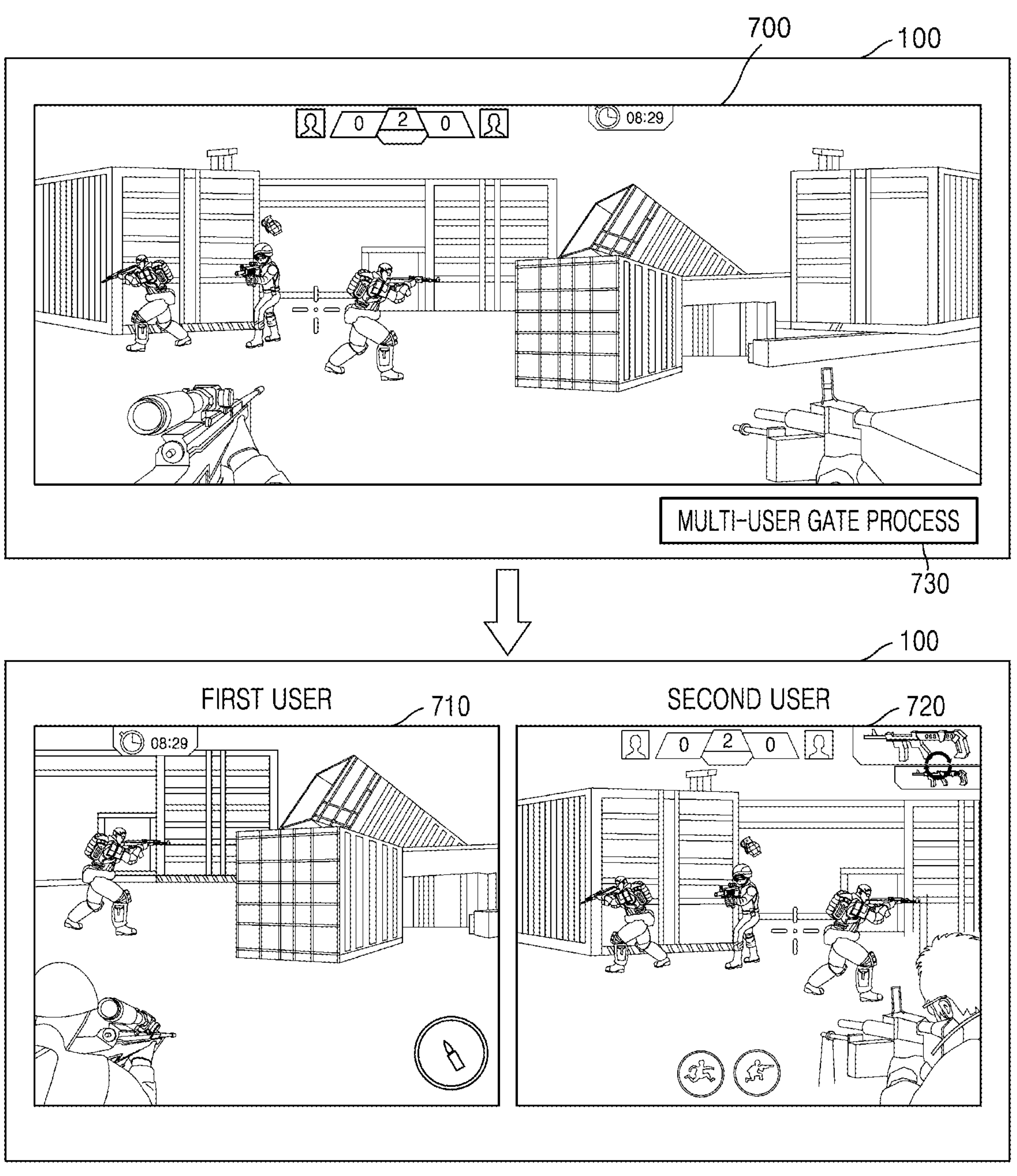
FIG. 7 is a reference diagram for describing an example in which a display apparatus provides a multi-view according to selection of a multi-user game.

FIG. 7 is a reference diagram for describing an example in which a display apparatus provides multi-view according to selection of a multi-user game.

Referring to FIG. 7, the display apparatus 100 may display game content according to user's selection. In addition, the display apparatus 100 may display an item 730 through which a multi-user game process may be selected. When the user selects the item 730 for processing the multi-user game, the display apparatus 100 may partition the display screen into two windows so that the users may respectively control the windows. In the display apparatus 100, a first window 710 included in the multi-window may be controlled by a first user and a second window 720 may be controlled by a second user.

The display apparatus 100 may connect a first game controller used by the first user to the first window 710 so that the first window 710 may be controlled by the first user and may connect the first audio input/output device used by the first user to the first window 710. The display apparatus 100 may connect the first audio input/output device to the first window 710 by using the Bluetooth communication protocol.

The display apparatus 100 may connect a second game controller used by the second user to the second window 720 so that the second window 720 may be controlled by the second user and may connect the second audio input/output device used by the second user to the second window 720. The display apparatus 100 may connect the first audio input/output device to the second window 720 by using the Bluetooth communication protocol.

The game content played by the multi-user may show different scenes according to each user's control. Therefore, even when the display apparatus 100 displays the first content on the first window 710 and the second window 720, the actual images displayed on the first window 710 and the second window 720 may be different from each other. For example, the image displayed on the first window may be the first image corresponding to a first place in the first content and the image displayed on the second window may be the second image corresponding to a second place in the first content.

Figure 8:
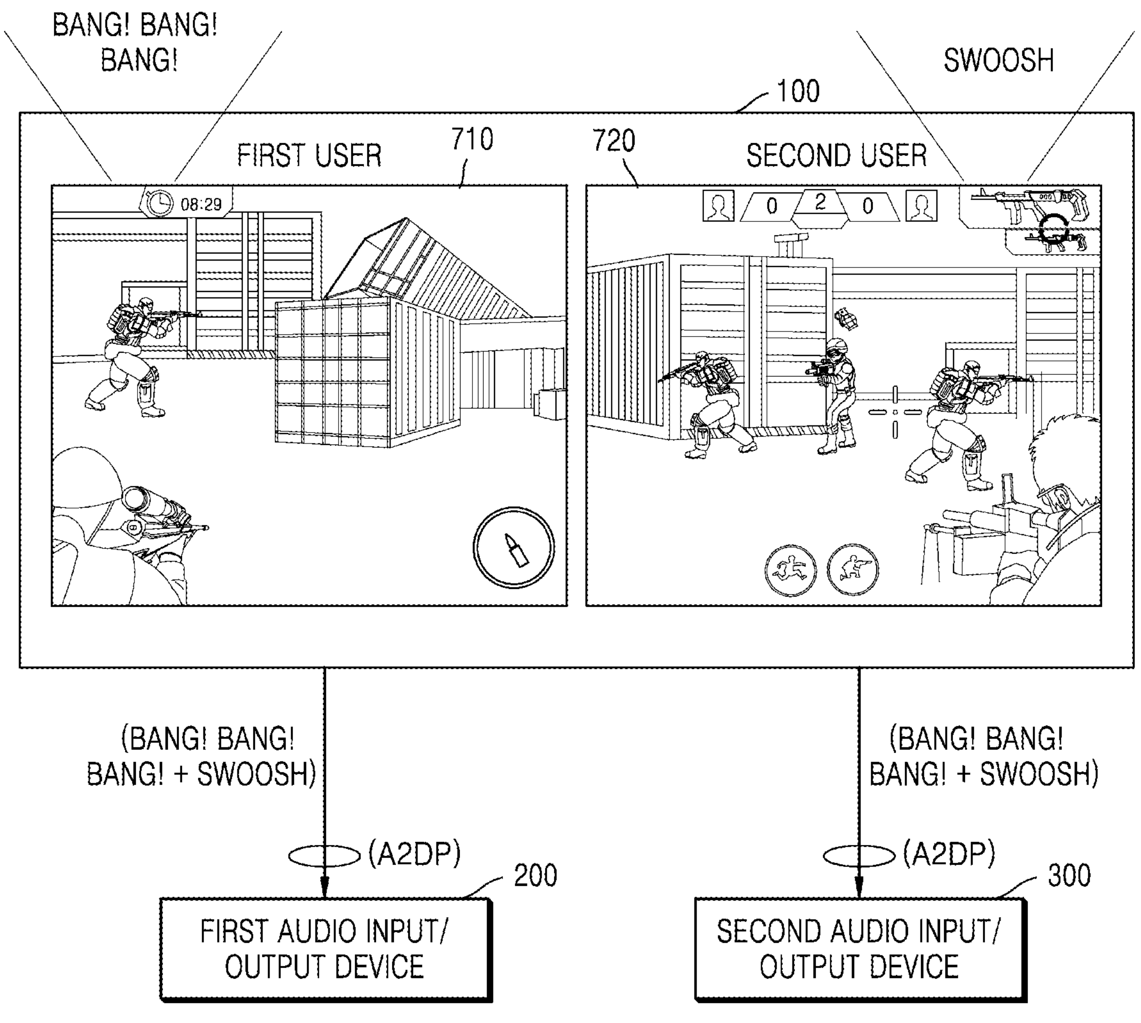
FIG. 8 is a diagram showing an example of a method of outputting audio in the case of a multi-user game, according to an embodiment.

FIG. 8 is a diagram showing an example of a method of outputting audio in the case of a multi-user game according to an embodiment.

Referring to FIG. 8, the display apparatus 100 may display the first image of the first content on the first window 710 and the second image of the first content on the second window 720 according to the control from the users. In this case, the first image displayed on the first window and the second image displayed on the second window show the scenes occurring in different places, and audio data corresponding to the first and second images may be different from each other. For example, as shown in FIG. 8, audio data "bang! bang! bang!" corresponding to the first image displayed on the first window 710 may be output, and audio data "swoosh!" corresponding to the second image displayed on the second window 720 may be output. Here, because the first user and the second user play the same content, that is, the first content, the sound of "bang! bang! bang!" corresponding to the first image and the sound of "swoosh!" corresponding to the second image may be output to both the first and second users. Therefore, the display apparatus 100 may mix the first audio data corresponding to the first image displayed on the first window 710 with the second audio data corresponding to the second image displayed on the second window 720, and may output the mixed audio data respectively to the first audio input/output device 200 and the second audio input/output device 300. When outputting the mixed audio data, the display apparatus 100 may output the mixed audio data by using the A2DP that is the Bluetooth profile dedicated for audio transfer.

Figure 9:
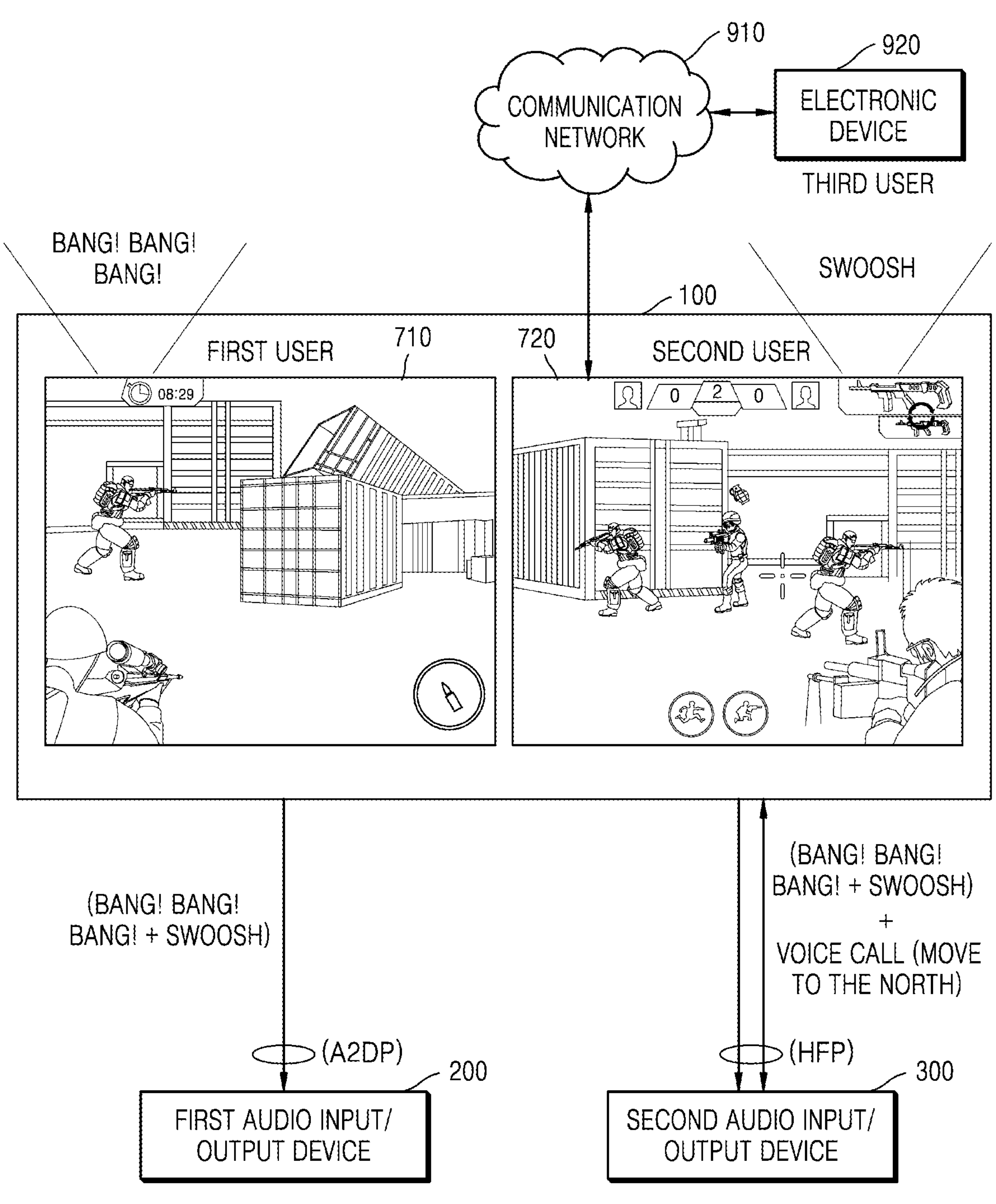
FIG. 9 is a reference diagram for describing operations when a voice call service is carried out by a user during a multi-user game, according to an embodiment.

FIG. 9 is a reference diagram for describing operations when a voice call service is carried out by a user during a multi-user game.

Referring to FIG. 9, the second user may want to use the voice call service while the game content is played through the multi-window of the display apparatus 100. Therefore, when the second user selects a voice call service item 900, the display apparatus 100 may provide the second user with the service so that the second user may make a voice call with a third user at a remote place through a communication network 910 according to the selection of the voice call service item 900. As described above, when the voice call service is selected by the second user, the display apparatus 100 needs to further mix the voice call sound (e.g., "move to the north!") transmitted/received between the second user and the third user, as well as the mixed audio data, and output the mixed data to the second audio input/output device 300. In order to output the voice call sound according to the Bluetooth communication protocol, the display apparatus 100 may use the HFP Bluetooth profile.

Therefore, the audio data mixed according to the A2DP profile is output through the first audio input/output device 200 used by the first user, and the mixed audio data+voice call sound may be output through the second audio input/output device 300 used by the second user according to the HFP profile. However, in this case, because the first user and the second user play the same first game content, and the mixed audio data that the first user and the second user listen to has to be synchronized. However, according to the A2DP profile, the buffer existing in the audio input/output device delays the speed, and thus, there may be a time difference between the mixed audio data the first user listens to and the mixed audio data the second user listens to. Therefore, the display apparatus 100 may provide a buffer in the Bluetooth interface corresponding to the HFP profile at the communication interface terminal of the display apparatus 100 so as to delay the audio data output according to the HFP, and thus, the audio data according to the HFP and the audio data according to the A2DP may be synchronized.

Figure 10:
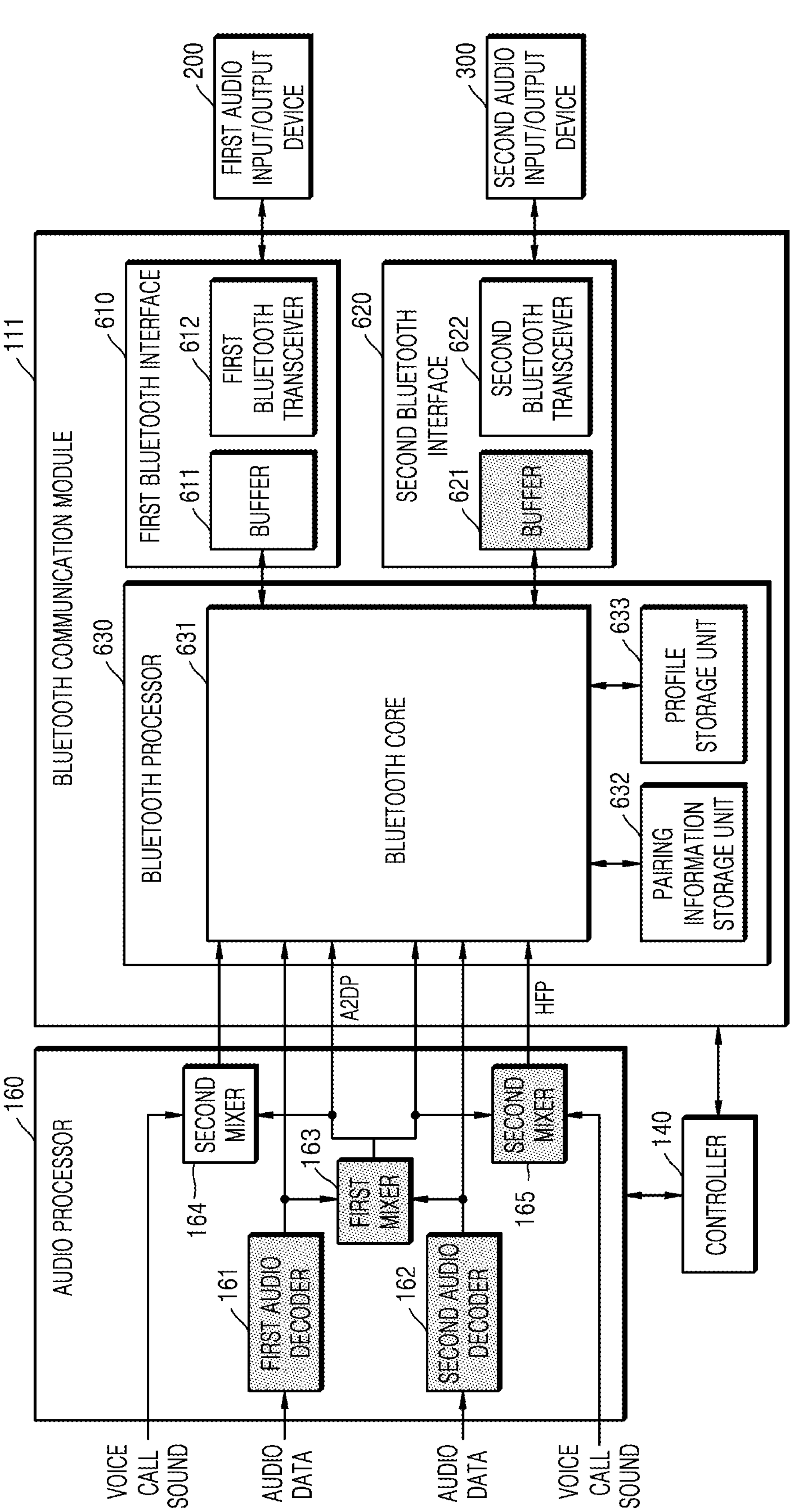
FIG. 10 is a reference diagram for describing operations of a display apparatus in the situation shown in FIG. 9, according to an embodiment.

FIG. 10 is a reference diagram for describing operations of a display apparatus in the situation shown in FIG. 9.

Referring to FIG. 10, the first audio decoder 161 receives and decodes the first audio decoder 161 corresponding to the first image of the first content displayed on the first window, and may output the decoded first audio data to the first mixer 163. The second audio decoder 162 may receive and decode the second audio data corresponding to the second image of the second content displayed on the second window, and may output the decoded second audio data to the first mixer 163.

The first mixer 163 may mix the first audio data and the second audio data, and may output the mixed audio data to the first Bluetooth interface 610.

According to the second user's selection of the voice call service, the third mixer 165 may mix the mixed audio data from the first mixer 163 with the voice call sound, and output the mixed data to the second Bluetooth interface.

The Bluetooth core 631 may signal-convert the mixed audio data according to the A2DP profile and control the converted data into the first audio input/output device 200.

The Bluetooth core 631 may signal-convert the mixed audio data and the voice call sound according to the HFP profile and control the converted data into the second audio input/output device 300.

In this case, in order to synchronize the audio data output through the first audio input/output device 200 with the audio data output through the second audio input/output device 300, the buffer 621 may be controlled so as to temporarily store the audio data+voice call sound processed according to the HFP Bluetooth profile for a preset period of time. When the display apparatus 100 may identify the size of the buffer for the A2DP profile included in the first audio input/output device 200, the display apparatus 100 may set the delay time of the buffer 621 of the second Bluetooth interface processing the data according to the HFP profile to be equal to the size of the buffer for the A2DP profile. When the display apparatus 100 may not identify the size of the buffer for the A2DP profile included in the first audio input/output device 200, the display apparatus 100 may provide a graphical user interface allowing the user to adjust the delay time of the buffer 621 of the second Bluetooth interface processing the data according to the HFP profile.

Figure 11:
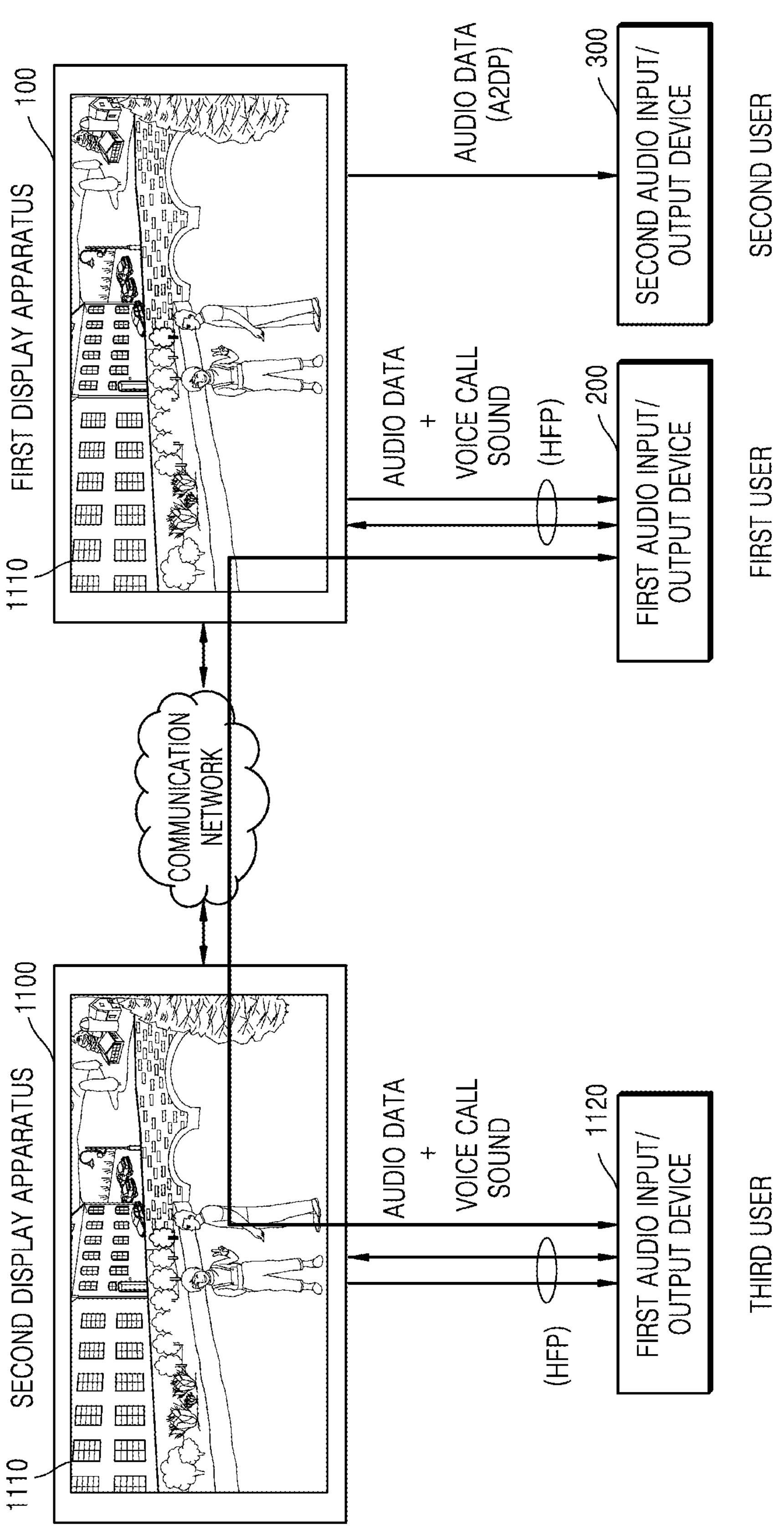
FIG. 11 is a reference diagram for describing an example in which a display apparatus displays images according to a selection of a watch together service, according to an embodiment.
Figure 12:
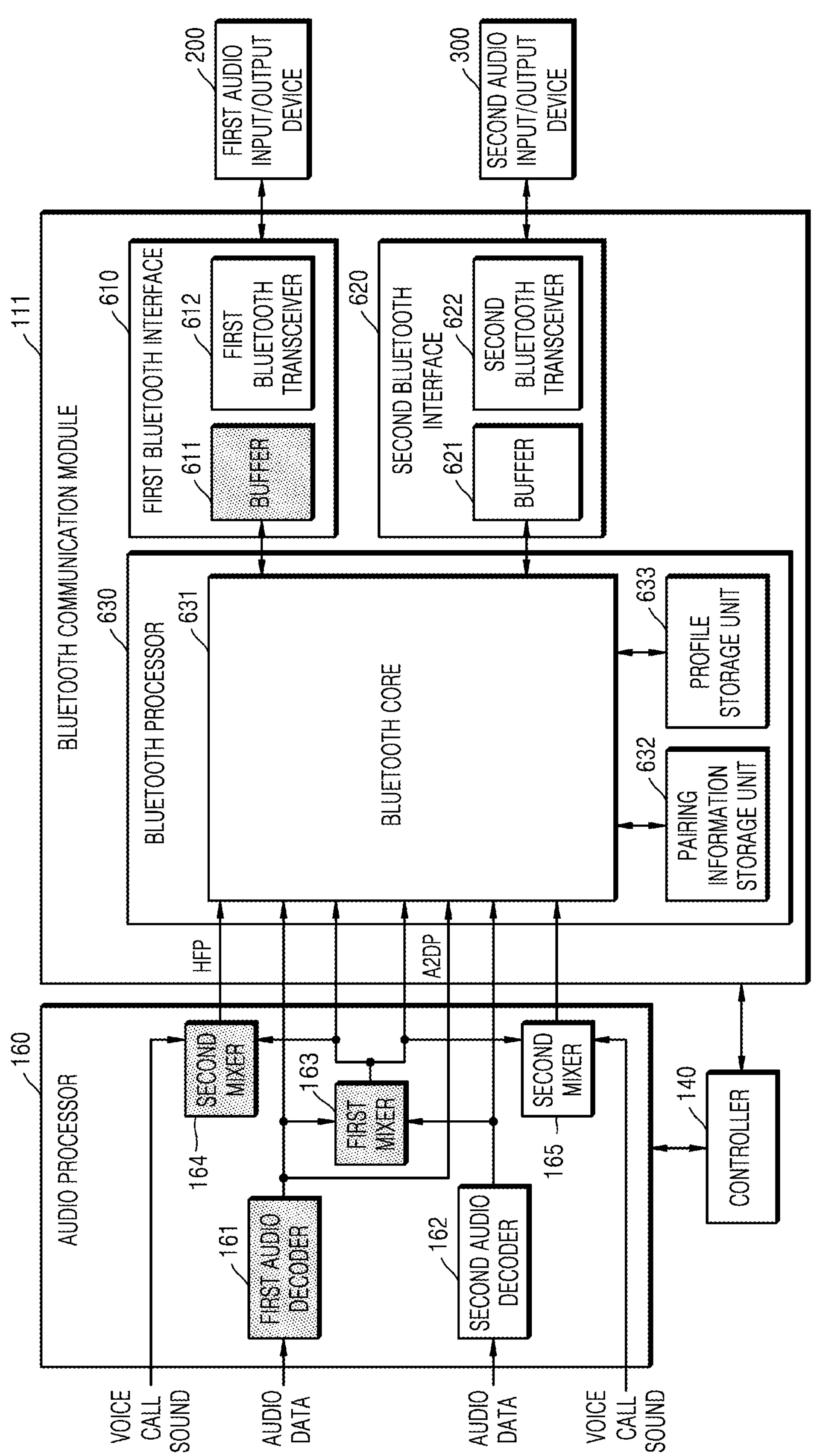
FIG. 12 is a reference diagram for describing operations of a display apparatus in the situation shown in FIG. 11, according to an embodiment.

Referring to FIGS. 11 and 12, an audio synchronization operation in the case in which the images are displayed according to a watch together service in the display apparatus 100 is described below. The watch together service denotes a service provided so that a plurality of users located at remote places from each other may have conversation while watching one piece of content simultaneously, and the conversation may be made by using, for example, voice call, video call, or text.

FIG. 11 is a reference diagram for describing an example in which a display apparatus displays images according to a selection of a watch together service.

Referring to FIG. 11, a first user of a first display apparatus may want to make a voice call while watching the image through the watch together service with a third user of a second display apparatus.

Therefore, the display apparatus 100 may mix the audio data corresponding to the image displayed on the display with the voice call sound, and output the mixed audio to the first audio input/output device 200. In this case, because the voice call sound is included in the output audio data, the display apparatus 100 may output the audio data to the first audio input/output device 200 by using the HFP profile.

In addition, in addition to the first user, a second user may also want to watch the content displayed on the first display apparatus 100 by using the second audio input/output device 300. In this case, the display apparatus 100 may output the audio data to the second audio input/output device 300 by using the A2DP profile.

In this case, because the first user and the second user watch the same image through the first display apparatus 100, there is no issue in watching the image provided that the audio data is synchronized. However, because the first audio input/output device 200 uses the HFP Bluetooth profile and the second audio input/output device 300 uses the A3DP profile, there may be a difference in the output speed of the audio data. Therefore, with respect to the audio data+voice call sound output to the first audio input/output device 200, the first display apparatus 100 may delay the audio data+voice call sound as much as the size of the buffer included in the second audio input/output device 300 and output to the first audio input/output device 200, for the audio data synchronization.

FIG. 12 is a reference diagram for describing operations of a display apparatus in the situation shown in FIG. 11.

Referring to FIG. 12, the first audio decoder 161 receives and decodes the first audio data corresponding to the first content displayed on the screen of the first display apparatus 100, and may output the decoded first audio data to the second mixer 164. In addition, the first audio decoder 161 may output the decoded first audio data to the second Bluetooth interface 620.

The second mixer 164 may mix the first audio data with the voice call sound and may output the mixed data to the first Bluetooth interface 610.

The Bluetooth core 631 may signal-convert the first audio data according to the A2DP profile and control the converted data into the second audio input/output device 300.

The Bluetooth core 631 may signal-convert the first audio data and the voice call sound according to the HFP profile and control the converted data into the first audio input/output device 200.

In this case, in order to synchronize the audio data output through the first audio input/output device 200 with the audio data output through the second audio input/output device 300, the Bluetooth core 631 control the buffer 611 so as to temporarily store the first audio data+voice call sound processed according to the HFP Bluetooth profile for a preset period of time. When the display apparatus 100 may identify the size of the buffer for the A2DP profile included in the second audio input/output device 300, the display apparatus 100 may set the delay time of the buffer 611 of the first Bluetooth interface processing the data according to the HFP profile to be equal to the size of the buffer for the A2DP profile. When the display apparatus 100 may not identify the size of the buffer for the A2DP profile included in the second audio input/output device 300, the display apparatus 100 may provide a graphical user interface allowing the user to adjust the delay time of the buffer 611 of the first Bluetooth interface processing the data according to the HFP profile.

Figure 13:
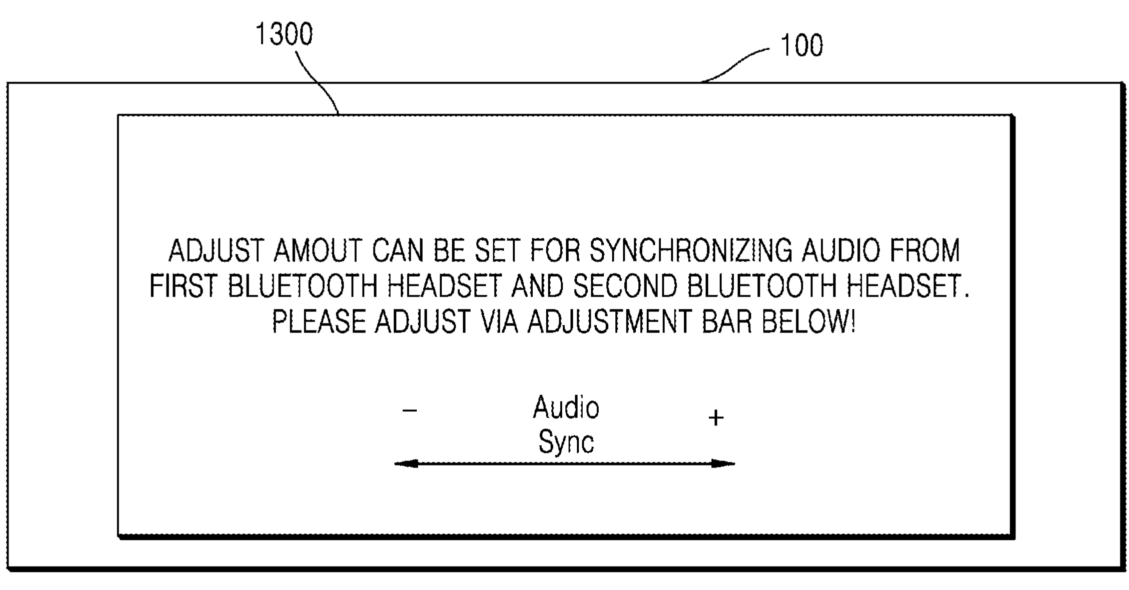
FIG. 13 is a diagram showing an example of a graphical user interface capable of adjusting a buffer delay time, according to an embodiment.

FIG. 13 is a diagram showing an example of a graphic user interface capable of adjusting a buffer delay time according to an embodiment.

Referring to FIG. 13, the display apparatus 100 may adjust an adjust amount for audio synchronization between a first Bluetooth headset and a second Bluetooth headset. A graphical user interface 1300 including an adjustment bar by which the adjust amount may be adjusted may be indicated along with a message "please adjust by using adjustment bar below". According to the graphical user interface 1300, a user may set an appropriate adjust amount by checking the audio output when moving the adjustment bar.

Some embodiments of the disclosure may be embodied in a storage medium including instruction codes executable by a computer or processor such as a program module executed by the computer. The computer-readable storage medium may be any available medium that may be accessed by a computer, and includes volatile and non-volatile media and removable and non-removable media. Also, the computer-readable medium may include both a computer storage medium. The computer storage medium may include volatile and non-volatile media and removable and non-removable media that are implemented using any method or technology for storing information, such as computer-readable instructions, a data structure, a program module, or other types of data.

In addition, the embodiment of the disclosure may be implemented as S/W programs including instructions stored in a computer-readable storage medium.

A computer is a device capable of fetching instructions stored in a storage medium and operating according to the instructions, and may include the electronic device according to the embodiment of the disclosure.

The computer-readable storage medium may be provided in the form of a non-transitory storage medium. Here, the term "non-transitory" simply denotes that the storage medium is a tangible device, and does not include a signal, but this term does not differentiate between where data is semi-permanently stored in the storage medium and where the data is temporarily stored in the storage medium.

Also, the control method according to one or more embodiments of the disclosure may be provided to be included in a computer program product. The computer program product may be traded between a seller and a buyer as a product.

The computer program product may include a S/W program, or a computer-readable storage medium on which the S/W program is stored. For example, the computer program product may include a product (e.g., a downloadable app) in the form of a S/W program that is electronically distributed through a device manufacturer or an electronic market (e.g., Google Play Store or App Store). For electronic distribution, at least a part of a S/W program may be stored in a storage medium or temporarily generated. In this case, the storage medium may include a server of a manufacturer, a server of an electronic market, or a storage medium of a relay server that temporarily stores a S/W program.

The computer program product may include a storage medium of a server or a storage medium of a device in a system including the server and the device. Alternatively, when there is a third device (e.g., smartphone) communicating with the server or the device, the computer program product may include a storage medium of the third device. Alternatively, the computer program product may include a S/W program itself that is transferred from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to implement the method according to the embodiment of the disclosure in a distributed manner.

For example, the server (e.g., a cloud server, an AI server, etc.) may execute the computer program product stored in the server, and may control the device communicating with the server to execute the method according to the embodiments of the disclosure.

In another example, the third device may execute the computer program product and may control the device communicating with the third device to execute the method according to the embodiment of the disclosure. When the third device execute the computer program product, the third device downloads the computer program product from the server and executes the computer program product. Alternatively, the third device may execute the computer program product provided in a preloaded state to perform the method according to the embodiments of the disclosure.

In addition, the terms such as " . . . unit", etc. provided herein may be realized by a hardware component such as a processor or a circuit, and/or a software component executed via a hardware component such as a processor.

The above description of the disclosure is provided for the purpose of illustration, and it would be understood by those skilled in the art that various changes and modifications may be made without changing technical conception and essential features of the disclosure. Thus, the embodiment of the disclosure set forth herein or shown above are to be interpreted in an illustrative and non-limiting sense. For example, each component described to be of a single type can be implanted in a distributed manner. Likewise, components described to be distributed can be implanted in a combined manner.

The scope of the disclosure is defined by the following claims rather than by the detailed description of the embodiment of the disclosure. It shall be understood that all modifications and embodiments conceived from the meaning and scope of the claims and their equivalents are included in the scope of the disclosure.

The invention claimed is:

1. A display apparatus comprising:
- a display;
- a synchronization buffer;
- a memory storing one or more instructions; and
- a processor configured to execute the one or more instructions stored in the memory to:
  - control the display to display a multi-window that includes a first window displaying a first image of content, and a second window displaying a second image of the content,
  - mix first audio data corresponding to the first image displayed in the first window and second audio data corresponding to the second image displayed in the second window, to thereby obtain mixed audio data,
  - based on the second window relating to a voice call function, mix the mixed audio data with voice call sound, to thereby obtain mixed audio and voice call sound data,
  - signal-convert the mixed audio data according to a first Bluetooth profile,
  - signal-convert the mixed audio and voice call sound data according to a second Bluetooth profile that is different from the first Bluetooth profile,
  - use the synchronization buffer to delay the signal-converted mixed audio and voice call sound data by a delay time provided by the synchronization buffer, to synchronize the signal-converted mixed audio and voice call sound data and the signal-converted mixed audio data,
  - output the signal converted mixed audio data to a first audio input/output device by a Bluetooth communication protocol, and
  - output the delayed signal converted mixed audio and voice call sound data to a second audio input/output device by the Bluetooth communication protocol.

2. The display apparatus of claim 1, wherein
- the first Bluetooth profile is an advanced audio distribution profile (A2DP) Bluetooth profile/output device, and
- the second Bluetooth profile is a hands-free profile (HFP) Bluetooth profile.

3. The display apparatus of claim 2, wherein
- the delay time is a preset period of time for synchronizing the signal-converted mixed audio and voice call sound data and the signal-converted mixed audio data.

4. The display apparatus of claim 1, wherein a preset size of the synchronization buffer for providing the delay time corresponds to a size of a buffer provided in the first audio input/output device.

5. The display apparatus of claim 4, wherein the processor is further configured to execute the one or more instructions to:
- control the display to display a graphical user interface allowing a user to adjust the delay time provided by the synchronization buffer, and
- adjust the delay time provided the synchronization buffer according to a user input received through the graphical user interface.

6. The display apparatus of claim 1, wherein the processor is further configured to execute the one or more instructions to:
- control the display to display first content, and
- obtain the first audio data corresponding to the first content.

7. The display apparatus of claim 1, wherein the processor is further configured to execute the one or more instructions to:
- identify a size of a buffer for the first Bluetooth profile included in the first audio input/output device, and
- set the delay time provided by the synchronization buffer to be equal to the identified size of the buffer included in the first audio input/output device.

8. A method comprising:
- controlling a display of a display apparatus to display a multi-window that includes a first window displaying a first image of content, and a second window displaying a second image of the content,
- mixing first audio data corresponding to the first image displayed in the first window and second audio data corresponding to the second image displayed in the second window, to thereby obtain mixed audio data,
- based on the second window relating to a voice call function, mixing the mixed audio data with voice call sound, to thereby obtain mixed audio and voice call sound data,
- signal-converting the mixed audio data according to a first Bluetooth profile,
- signal-converting the mixed audio and voice call sound data according to a second Bluetooth profile that is different from the first Bluetooth profile,
- using a synchronization buffer to delay the signal-converted mixed audio and voice call sound data by a delay time provided by the synchronization buffer, to synchronize the signal-converted mixed audio and voice call sound data and the signal-converted mixed audio data, outputting the signal converted mixed audio data to a first audio input/output device by a Bluetooth communication protocol, and outputting the delayed signal converted mixed audio and voice call sound data to a second audio input/output device by the Bluetooth communication protocol.

9. The method of claim 8, wherein the first Bluetooth profile is an advanced audio distribution profile (A2DP) Bluetooth profile, and the second Bluetooth profile is a hands-free profile (HFP) Bluetooth profile.

10. The method of claim 8, wherein the delay time is a preset period of time for synchronizing the signal-converted mixed audio and voice call sound data and the signal-converted mixed audio data.

11. The method of claim 8, wherein a preset size of the synchronization buffer for providing the delay time corresponds to a size of a buffer provided in the first audio input/output device.

12. The method of claim 8, further comprising:

identifying a size of a buffer for the first Bluetooth profile included in the first audio input/output device, and setting the delay time provided by the synchronization buffer to be equal to the identified size of the buffer included in the first audio input/output device.

13. A non-transitory computer-readable recording medium having recorded thereon one or more programs executable by a processor of a display apparatus to implement a method of the display apparatus, wherein the method comprises:

controlling a display of the display apparatus to display a multi-window that includes a first window displaying a first image of content, and a second window displaying a second image of the content, mixing first audio data corresponding to the first image displayed in the first window and second audio data corresponding to the second image displayed in the second window, to thereby obtain mixed audio data, based on the second window relating to a voice call function, mixing the mixed audio data with voice call sound, to thereby obtain mixed audio and voice call sound data, signal-converting the mixed audio data according to a first Bluetooth profile, signal-converting the mixed audio and voice call sound data according to a second Bluetooth profile that is different from the first Bluetooth profile, using a synchronization buffer to delay the signal-converted mixed audio and voice call sound data by a delay time provided by the synchronization buffer, to synchronize the signal-converted mixed audio and voice call sound data and the signal-converted mixed audio data, outputting the signal converted mixed audio data to a first audio input/output device by a Bluetooth communication protocol, and outputting the delayed signal converted mixed audio and voice call sound data to a second audio input/output device by the Bluetooth communication protocol.

14. The non-transitory computer-readable recording medium of claim 13, wherein the method further comprises:

identifying a size of a buffer for the first Bluetooth profile included in the first audio input/output device, and setting the delay time provided by the synchronization buffer to be equal to the identified size of the buffer included in the first audio input/output device.

* * * * *